(12) United States Patent
Swidersky et al.

(10) Patent No.: US 10,636,207 B1
(45) Date of Patent: Apr. 28, 2020

(54) SYSTEMS AND METHODS FOR GENERATING A THREE-DIMENSIONAL MAP

(71) Applicant: MappedIn Inc., Kitchener (CA)

(72) Inventors: James Nathan Swidersky, Kitchener (CA); Patrick Paskaris, Kitchener (CA); Mitchell Butler, Kitchener (CA); Erkang Wei, Waterloo (CA); Zachary Sean Cregan, Kitchener (CA)

(73) Assignee: MAPPEDIN INC., Waterloo (CA)

( * ) Notice: Subject to any disclaimer, the term of this patent is extended or adjusted under 35 U.S.C. 154(b) by 0 days.

(21) Appl. No.: 15/916,830

(22) Filed: Mar. 9, 2018

Related U.S. Application Data

(60) Provisional application No. 62/469,186, filed on Mar. 9, 2017.

(51) Int. Cl.
*G06T 17/05* (2011.01)
*G06T 17/20* (2006.01)
*G06T 15/20* (2011.01)
*G01C 21/06* (2006.01)

(52) U.S. Cl.
CPC .............. *G06T 17/20* (2013.01); *G01C 21/06* (2013.01); *G06T 15/20* (2013.01); *G06T 17/05* (2013.01)

(58) Field of Classification Search
CPC .... G01C 21/06; G01C 21/3635; G06T 17/05; G06T 17/10; G06T 17/20
See application file for complete search history.

(56) References Cited

U.S. PATENT DOCUMENTS

| | | | |
|---|---|---|---|
| 8,320,939 B1* | 11/2012 | Vincent .................. | G01S 19/48 370/338 |
| 8,994,726 B1* | 3/2015 | Furukawa ............... | G06T 17/10 345/420 |
| 9,702,706 B2 | 7/2017 | Liu et al. | |
| 2006/0247849 A1* | 11/2006 | Mohsini ................. | G01C 21/20 701/434 |
| 2009/0216438 A1* | 8/2009 | Shafer .................... | G01C 21/20 701/414 |
| 2012/0062384 A1 | 3/2012 | McDanal et al. | |
| 2012/0173137 A1* | 7/2012 | Compton ............. | G01C 21/206 701/423 |
| 2013/0321392 A1* | 12/2013 | van der Merwe ..... | G01C 21/20 345/419 |
| 2014/0195157 A1* | 7/2014 | Gupta .................. | G01C 21/206 701/533 |
| 2016/0350982 A1* | 12/2016 | Lindberg ................ | G06T 19/20 |

OTHER PUBLICATIONS

Selamat et al., "A fast path planning algorithm for route guidance system", IEEE International Conference on Systems, Man, and Cybernetics, 2011 (Year: 2011).*

* cited by examiner

*Primary Examiner* — Diane M Wills
(74) *Attorney, Agent, or Firm* — Own Innovation; James W. Hinton

(57) ABSTRACT

A system and method for generating a three-dimensional (3D) map of a facility is provided. The system has at least one processor and a memory having stored thereon instructions that, upon execution by the at least one processor, cause the system to perform functions comprising: receiving a two-dimensional (2D) map of the facility; converting or importing the 2D map to a base map; generating or editing polygons on the base map, each polygon representative of a facility unit in the base map; generating one or more perspectives at one or more points on the base map to generate the 3D map.

22 Claims, 25 Drawing Sheets

SYSTEMS AND METHODS FOR GENERATING A THREE-DIMENSIONAL MAP

TECHNICAL FIELD

The embodiments disclosed herein relates to indoor maps, and, in particular to systems and methods for generating a three-dimensional (3D) map of a facility for facility wayfinding.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

Further, traditional physical signs and directories for wayfinding within facilities have presented map information by way of two-dimensional (2D) images that are static and therefore difficult for users wayfinding within a facility.

Map applications presenting three-dimensional (3D) maps of facilities have the potential to provide users with more accurate wayfinding information in an organized and dynamic manner. However, 3D maps of facilities are difficult and expensive to generate.

SUMMARY

The present application discloses embodiments that relate to generating a 3D map of a facility.

In accordance with one aspect, the present application describes a system. The system includes at least one processor and a memory having stored thereon instructions that, upon execution by the at least one processor, cause the system to perform functions comprising: receiving a 2D map of the facility; converting or importing the 2D map to a base map; generating or editing polygons on the base map, each polygon representative of a facility unit in the base map; and generating one or more perspectives at one or more points on the base map to generate the 3D map.

In another aspect of the system, generating or editing the polygons includes generating or editing a height of the facility unit represented by the polygon.

In another aspect of the system, the step of generating one or more perspectives includes building one or more layers of the base map, each layer comprising one or more objects with similar attributes; and selecting the one or more perspectives by rotating the one or more layers.

In another aspect of the system, the one or more perspectives are selected to generate a tilting effect, the tilting effect giving a sense of height and depth when interacting with the 3D map.

In another aspect of the system, the system further includes: generating a plurality of nodes on the base map; and generating one or more paths on the base map, each path connecting two or more nodes.

In another aspect of the system, the 3D map is generated or updated through a portal management suite located on, or operatively connected to, a server platform included in a wayfinding system.

In another aspect of the system, the portal management suite is accessible through a web browser.

In another aspect of the system, the generating of the one or more perspectives is performed using a mapping engine included in the portal management suite.

In another aspect of the system, the mapping engine is configured to facilitate the generating of the plurality of nodes, and the one or more paths, for each of the one or more perspectives.

In another aspect of the system, the system further includes: generating one or more labels; and applying the one or more labels to each of the one or more perspectives.

In another aspect of the system, the one or more labels are dynamic labels which rotate as the 3D map is rotated to provide a consistent orientation for a user viewing the one or more labels.

In another aspect of the system, the system further includes: setting three or more control points on the base map; and adding the three or more control points to each of the one or more perspectives, wherein the three or more control points are defined by Cartesian coordinates which facilitate geo-referencing within the 3D map.

In another aspect of the system, the setting of the three or more control points on the base map includes manually setting or automatically computing the three or more control points on the base map.

In another aspect of the system, the system further includes: converting the three or more control points from Cartesian coordinates to corresponding longitudes and latitudes.

In another aspect of the system, the system further includes rendering the 3D map with turn-by-turn directions to provide for ease of navigation.

In another aspect of the system, the 3D map is displayed on one or more public display devices.

In another aspect of the system, updates to the 3D map are pushed in real time or near real-time, or on a pre-determined schedule, to the one or more public display devices.

In another aspect, the present application describes a method. The method includes receiving a 2D map of the facility; converting or importing the 2D map to a base map; generating or editing polygons on the base map, each polygon representative of a facility unit in the base map; and generating one or more perspectives at one or more points on the base map to generate the 3D map.

In another aspect of the method, generating or editing the polygons includes generating or editing a height of the facility unit represented by the polygon.

In another aspect of the method, the step of generating one or more perspectives includes building one or more layers of the base map, each layer comprising one or more objects with similar attributes; and selecting the one or more perspectives by rotating the one or more layers.

In another aspect of the method, the one or more perspectives are selected to generate a tilting effect, the tilting effect giving a sense of height and depth when interacting with the 3D map.

In another aspect of the method, the method further includes: generating a plurality of nodes on the base map; and generating one or more paths on the base map, each path connecting two or more nodes.

In another aspect of the method, the 3D map is generated or updated through a portal management suite located on, or operatively connected to, a server platform included in a wayfinding system.

In another aspect of the method, the portal management suite is accessible through a web browser.

In another aspect of the method, the generating of the one or more perspectives is performed using a mapping engine included in the portal management suite.

In another aspect of the method, the mapping engine is configured to facilitate the generating of the plurality of nodes, and the one or more paths, for each of the one or more perspectives.

In another aspect of the method, the method further includes: generating one or more labels; and applying the one or more labels to each of the one or more perspectives.

In another aspect of the method, the one or more labels are dynamic labels which rotate as the 3D map is rotated to provide a consistent orientation for a user viewing the one or more labels.

In another aspect of the method, the method further includes: setting three or more control points on the base map; and adding the three or more control points to each of the one or more perspectives, wherein the three or more control points are defined by Cartesian coordinates which facilitate geo-referencing within the 3D map.

In another aspect of the method, the setting of the three or more control points on the base map includes manually setting or automatically computing the three or more control points on the base map.

In another aspect of the method, the method further includes: converting the three or more control points from Cartesian coordinates to corresponding longitudes and latitudes.

In another aspect of the method, the method further includes rendering the 3D map with turn-by-turn directions to provide for ease of navigation.

In another aspect of the method, the 3D map is displayed on one or more public display devices.

In another aspect of the method, updates to the 3D map are pushed in real time or near real-time, or on a predetermined schedule, to the one or more public display devices.

According to some embodiments, there is a system for generating a three-dimensional (3D) map of a facility. The system includes at least one processor, and a memory having stored thereon instructions that, upon execution by the at least one processor, cause the system to perform functions comprising: receiving a two-dimensional (2D) map of the facility; converting or importing the 2D map to a base map; generating or editing polygons on the base map, each polygon representative of a facility unit in the base map; and generating one or more perspectives at one or more points on the base map to generate the 3D map.

According to some embodiments, there is a method of generating a three-dimensional (3D) map of a facility comprising: receiving a two-dimensional (2D) map of the facility; converting or importing the 2D map to a base map; generating or editing polygons on the base map, each polygon representative of a facility unit in the facility map; generating one or more perspectives at one or more points on the base map; generating one or more nodes on the base map; and generating one or more paths on the base map.

The method and system may further include generating a plurality of nodes on the base map; and generating one or more paths on the base map, each path connecting two one or more nodes. Generating or editing the polygons includes generating or editing a height of the facility represented by the polygon. Generating one or more perspectives includes: building one or more layers of the base map, each layer comprising one or more objects with similar attributes; and selecting the one or more perspectives by rotating the one or more layers.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1A:
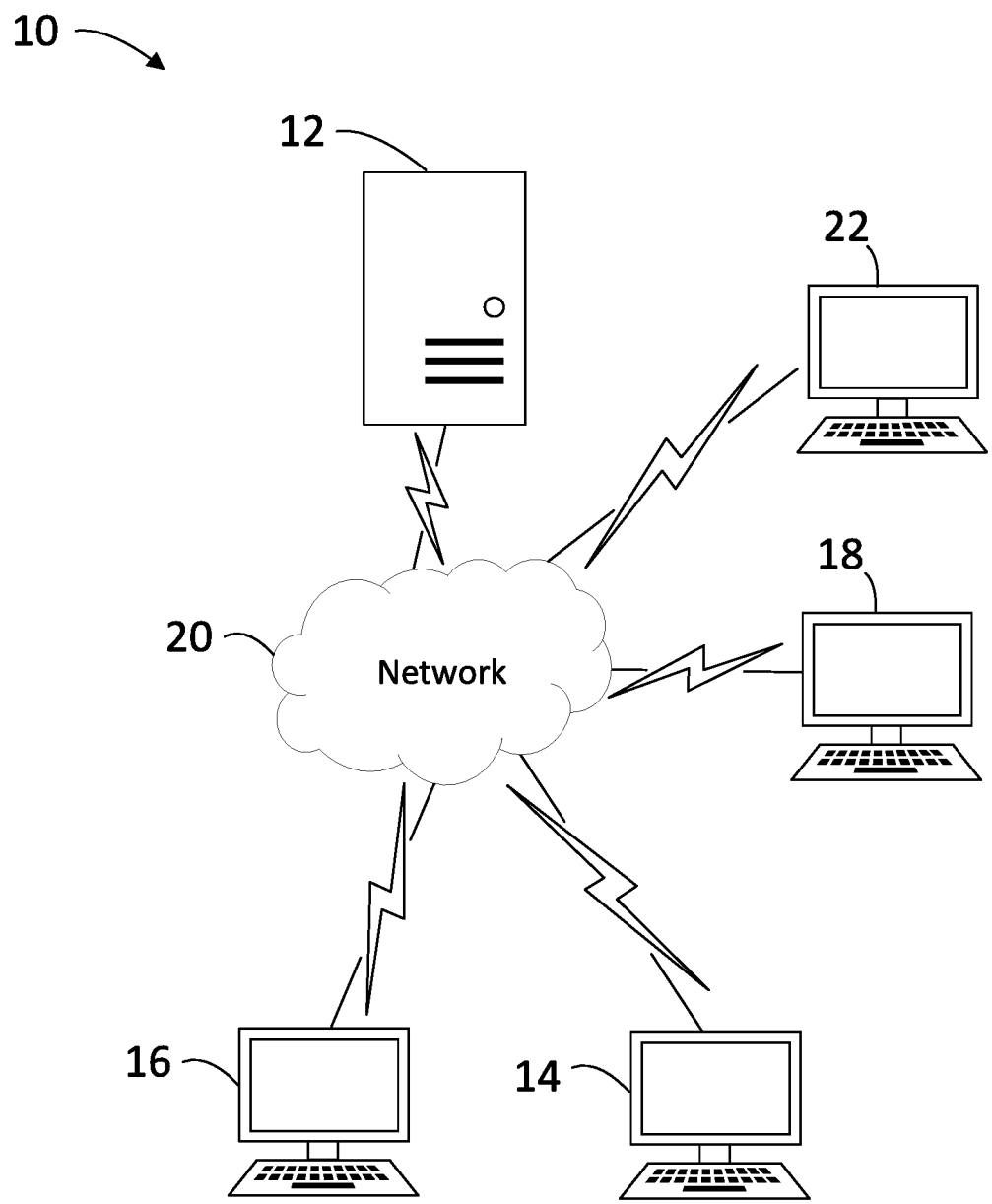
FIG. 1A is a diagram of a wayfinding system, in accordance with an embodiment.

FIG. 1A shows a block diagram illustrating a wayfinding system 10 for creating maps of a facility, in accordance with an embodiment. The wayfinding system 10 is for a facility including multiple facility units, i.e., a facility wayfinding system. The wayfinding system 10 is not restricted to a single facility, but may be extended to multiple facilities of the same type and/or different types, each including multiple facility units.

The wayfinding system 10 allows users, e.g., visitors to the facility, to orient themselves and to navigate from place to place within the facility, enabling them to find what they are looking for and to discover things around them. For example, a shopper at a mall can use the wayfinding system to search for a particular store or a particular item or class of items (e.g., shoes), navigate to the relevant location, and/or look at the current promotions.

The facility may be any type of facility. Typically, the facility is a commercial facility or an institutional facility. For example, the facility may be a retail facility, e.g., a mall or a shopping center, an office facility, e.g., an office building, an event facility, e.g., a conference center or a theme park, a transportation facility, e.g., an airport, an educational facility, e.g., a school or a university campus, or a medical facility, e.g., a hospital. The facility may be an indoor or an outdoor facility. However, the wayfinding system is particularly useful for indoor facilities.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

The wayfinding system 10 may include a facility wayfinding system, such as those described in U.S. Pat. No. 9,702,706, which is hereby incorporated by reference in its entirety.

The wayfinding system 10 includes a server platform 12 which communicates with a plurality of store devices 14, a plurality of facility devices 16, and a plurality of administrator devices 18 via a network 20. The server platform 12 also communicates with a plurality of visitor devices 22. The server platform 12 may be a purpose built machine designed specifically for implementing a system and method for creating maps of a facility.

The server platform 12, store devices 14, facility devices 16, administrator devices 18 and visitor devices 22, may be a server computer, desktop computer, notebook computer, tablet, PDA, smartphone, or another computing device. The devices 12, 14, 16, 18, and 22 may include a connection with the network 20 such as a wired or wireless connection to the Internet. In some cases, the network 20 may include other types of computer or telecommunication networks. The devices 12, 14, 16, 18, and 22 may include one or more of a memory, a secondary storage device, a processor, an input device, a display device, and/or an output device. The memory may include random access memory (RAM) or similar types of memory. Also, the memory may store one or more applications for execution by the processor. Applications may correspond with software modules comprising computer executable instructions to perform processing for the functions described below. The secondary storage device may include a hard disk drive, floppy disk drive, CD drive, DVD drive, Blu-ray drive, or other types of non-volatile data storage. The processor may execute applications, computer readable instructions or programs. The applications, computer readable instructions or programs may be stored in the memory or in the secondary storage, or may be received from the Internet or other network 20. The input device may include any device for entering information into device 12, 14, 16, 18, and 22. For example, the input device may be a keyboard, key pad, cursor-control device, touch-screen, camera, or microphone. The display device may include any type of device for presenting visual information. For example, the display device may be a computer monitor, a flat-screen display, a projector or a display panel. The output device may include any type of device for presenting a hard copy of information, such as a printer for example. The output device may also include other types of output devices such as speakers, for example. In some cases, device 12, 14, 16, 18, and 22 may include multiple of any one or more of processors, applications, software modules, second storage devices, network connections, input devices, output devices, and display devices.

Although devices 12, 14, 16, 18, and 22 are described with various components, one skilled in the art will appreciate that the devices 12, 14, 16, 18, and 22 may in some cases contain fewer, additional or different components. In addition, although aspects of an implementation of the devices 12, 14, 16, 18, and 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, and 22 and/or processor to perform a particular method.

In the description that follows, devices such as server platform 12, store devices 14, facility devices 16, administrator devices 18, and visitor devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 14, 16, 18, and 22 may send information to the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. Generally, the information may comprise at least an identifier identifying the store, facility, administrator, or visitor. For example, the information may comprise one or more of a username, e-mail address, password, or social media handle.

In response to receiving information, the server platform 12 may store the information in a storage database. The storage database may correspond with the secondary storage of the device 12, 14, 16, 18, and 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, the storage database may be located remotely from the server platform 12 and accessible to server platform 12 across a network for example. In some cases, the storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The devices 14, 16, 18, and 22 and the server platform 12 may communicate asynchronously, for example, by using an implementation of the WebSocket protocol, such as Socket.IO. Updates may be sent from the server platform 12 to each of the devices 14, 16, 18, and 22 in real time as interrupts, i.e., without polling. Likewise, user interaction data may be sent from each of the devices 14, 16, 18, and 22 to the server platform 12 in real time as interrupts, i.e., without polling.

Figure 1B:
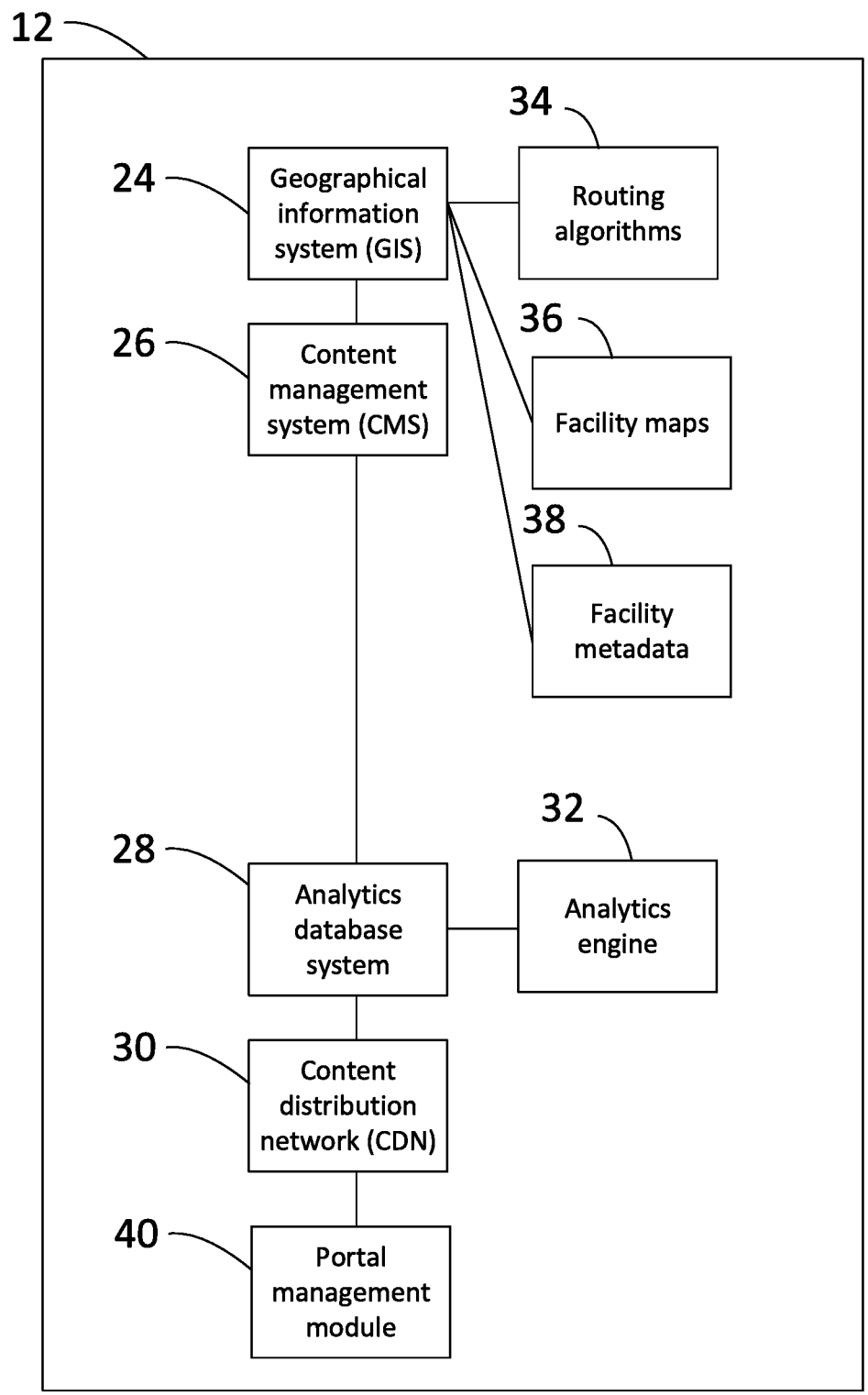
FIG. 1B is a block diagram of a server platform of the wayfinding system of FIG. 1A.

Turning now to FIG. 1B, illustrated therein is the server platform 12, in accordance with an embodiment. The server platform 12 includes a content management system (CMS) 26, an analytics database system 28, a geographical information system (GIS) 24, and a content distribution network (CDN) 30.

In some embodiments, CMS 26 stores content, including information relating to the facility and the facility units, and handles updates to the content received from the devices 14, 16, 18, and 22, and provides content to the devices 14, 16, 18, and 22. In some embodiments, the analytics database system 28 includes or is operatively connected to an analytics engine 32. User interactions may be recorded for several different devices 14, 16, 18, and 22.

The GIS 24 also uses routing algorithms 34 to calculate routes and provides the routes to the devices 14, 16, 18, and 22. Typically, the routing calculations output a JSON/XML list of node or polygon identifiers representing a complete path, which the devices 14, 16, 18, and 22 will interpret and display. The output may also include points of interest and other facility metadata 38, such as total estimated travel time based on the type of path and the real-time traffic, as described herein.

The visitor devices 22 may be efficiently managed and run both online and offline. The visitor devices 22 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 22 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

The server platform 12 may include a portal management module 40 for managing the system 10. The store device 14, the facility device 16, and the administrator device 18 communicate with the portal management module 40 to create and modify facility related data.

With portal management module 40, all building data may be generated or modified using one tool via a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). For example, the administrator device 18 may have higher security clearance in terms of accessing and updating data, and modifying settings. The facility device 16 may be able to change venue and store description, logos and so on, but cannot alter maps. The store device 14 may be able to modify or alter data relating to their own store. Additional rules may be enforced if desired. For example, a user may only access and/or change certain data pertaining to certain stores, and so on.

For example, a venue editor may log into portal management module 40, make edits to a facility map 36 and save the facility map 36 at different stages. The unfinished facility map 36 may be saved in draft mode, where the editor may not have permission to publish the updated facility map until approved by an administrator or a facility owner, and the system may be configured to track approvals.

Figure 2:
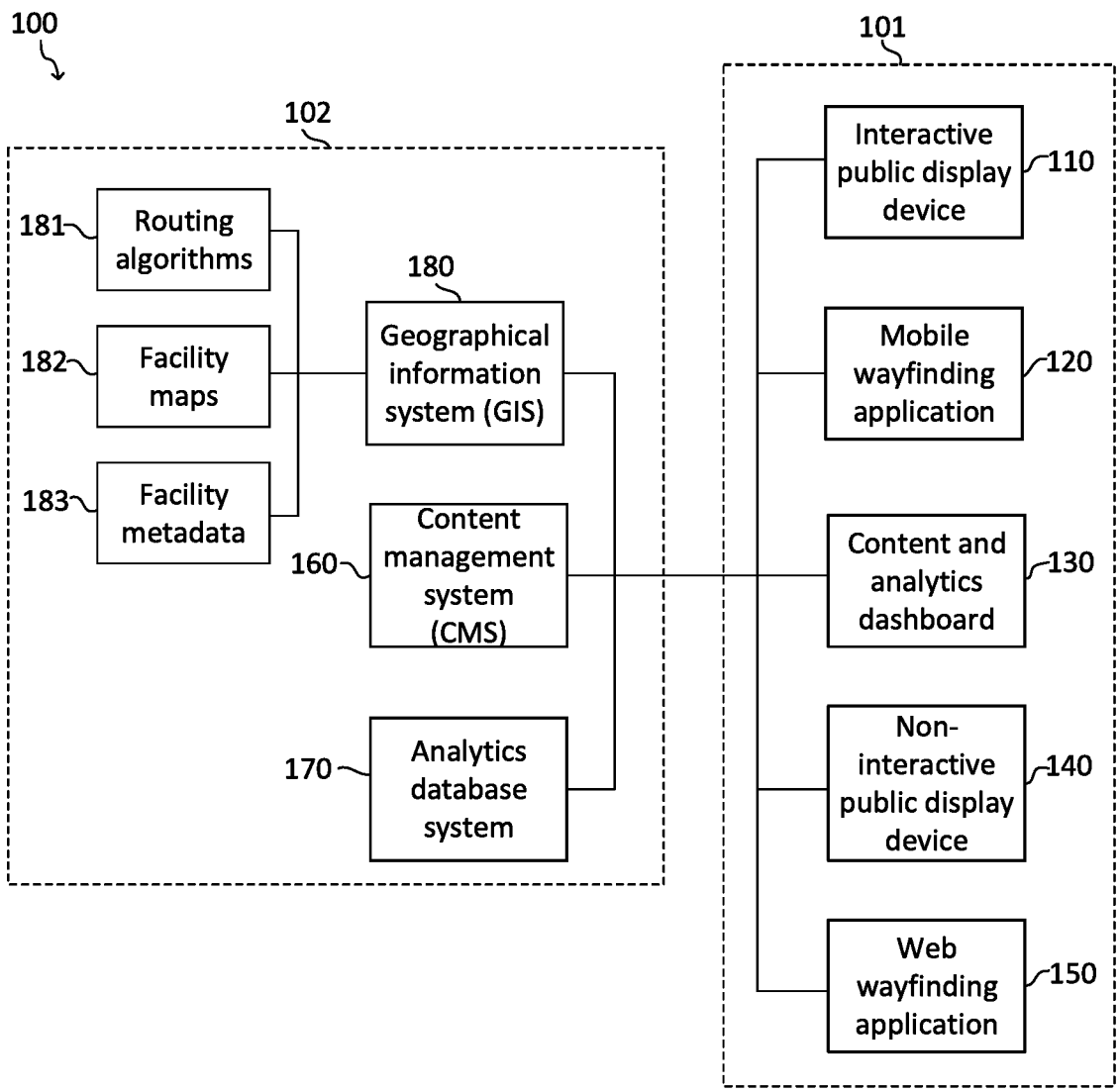
FIG. 2 is a block diagram of a facility wayfinding system in accordance with an embodiment.

With reference to FIG. 2, an exemplary embodiment of the wayfinding system 100 includes a variety of user-facing components 101, all supported by a common backend system 102. Advantageously, by using a common backend system 102 for user-facing components 101, system speed is increased and infrastructure costs are reduced. The user-facing components 101 and the backend system 102 are operatively connected, typically, via the Internet. The individual connections may be wired or wireless connections.

Preferably, the user-facing components 101 and the backend system 102 communicate asynchronously, for example, by using an implementation of the WebSocket protocol, such as Socket.IO. Updates are, preferably, sent from the common backend system 102 to each of the user-facing components 101 in real time as interrupts, i.e., without polling. Likewise, user interaction data is, preferably, sent from each of the user-facing components 101 to the common backend system 102 in real time as interrupts, i.e., without polling.

The user-facing components 101 may include one or more of: an interactive public display device 110, (e.g., a digital directory), a mobile wayfinding application 120, a content and analytics dashboard 130, a non-interactive public display device 140, (i.e., a digital sign), and a web wayfinding application 150. Although a single instance of each of the user-facing components 101 is illustrated in FIG. 2, the wayfinding system 100 may include multiple instances of each of the user-facing components 101. The common backend system 102 includes a content management system (CMS) 160, an analytics database system 170, and a geographical information system (GIS) 180.

Note that other embodiments may omit some of these components or systems and/or include additional components or systems. The wayfinding system 100 is customizable for the type of facility. Different types of facilities have different needs, and the wayfinding system 100 may be customized to suit those needs. Each of the user-facing components 101 may be customized in terms of the appearance of the user interfaces and the types of information displayed via the user interfaces. For example, for a convention center, a consistent color theme may be selected for the user interfaces, and the background information about speakers and/or seminar information may be displayed.

In general, the interactive public display device 110 and the non-interactive public display device 140 each include a processor, memory, and a network interface card. These devices, specifically, the processors thereof, are configured by applications mentioned hereafter to execute the actions described hereafter. In general, the mobile wayfinding application 120, the content and analytics dashboard 130, the CMS 160, the analytics database system 170, and the GIS 180 each run on devices including a processor, memory, and a network interface card, and thereby, configure the devices, specifically, the processors thereof, to execute the actions described hereafter. The applications are, generally, embodied in a non-transitory computer-readable storage media, typically, device memories, and are executable by device processors.

In some embodiments, the interactive public display device 110, and the non-interactive public display device 140, may also comprise a kiosk showing facility information or directory.

The interactive public display device 110 may be situated at a particular location within the facility. Typically, the interactive public display device 110 may be fixed or mounted at the particular location. Preferably, the interactive public display device 110 is provided with an identifier, e.g., a serial number, which uniquely identifies the interactive public display device 110 among multiple interactive public display devices 110 situated at different locations within the same and/or different facilities.

The interactive public display device 110 may have a variety of designs depending on its location. For example, the interactive public display device 110 may have a free-standing kiosk design or a wall-mounted design. In addition to a processor, memory, and a network interface card, the interactive public display device 110 includes a display and, preferably, a synchronization feature.

The display of the interactive public display device 110 is a large-screen display adapted for public viewing. For example, the display may have a diagonal screen size of greater than 30" (76 cm). Typically, the display is a touch-screen display, e.g., a capacitive touch-screen display. For example, the display may be a liquid crystal display (LCD) with an integrated or separate touch-sensing mechanism. In some instances, the interactive public display device 110 may include a separate input device, e.g., a touchpad, one or more keys, and/or a keyboard, in addition to or instead of a touch-screen display.

The synchronization feature is, typically, an external, scannable, i.e., machine-readable, feature. For example, the synchronization feature may be a quick response (QR) code or a near-field communication (NFC) tag. A QR code may be printed on a sticker or other medium and attached to the interactive public display device 110, or may be printed or painted directly on the interactive public display device 110. An NFC tag, which is, typically, made of a conductive material such as copper, may be embedded in a sticker or other medium and attached to the surface of the interactive public display device 110, or may be embedded directly into the interactive public display device 110. In some instances, the interactive public display device 110 may include multiple synchronization features of different types. For example, the interactive public display device 110 may include both a QR code and an NFC tag, disposed separately from one another on the interactive public display device 110 or disposed on top of one another on the interactive public display device 110.

The synchronization feature is configured to enable a mobile device, running the mobile wayfinding application 120, to synchronize with the interactive public display device 110, typically, by scanning the synchronization feature. Preferably, the synchronization feature is encoded with the identifier of the interactive public display device 110.

For example, the identifier may be included in a unique uniform resource locator (URL) corresponding to the interactive public display device 110. When synchronized from the operating system of the mobile device, e.g., by using a QR reader application or a built-in NFC reader, the URL directs to the appropriate download page for the mobile wayfinding application 120, e.g., an application or "app" store. When synchronized from within the mobile wayfinding application 120, e.g., by using an in-app reader/scanner, the mobile wayfinding application 120 loads the state of the interactive public display device 110 through the common backend system 102 by referencing the unique URL.

Figures 3A, 3B:
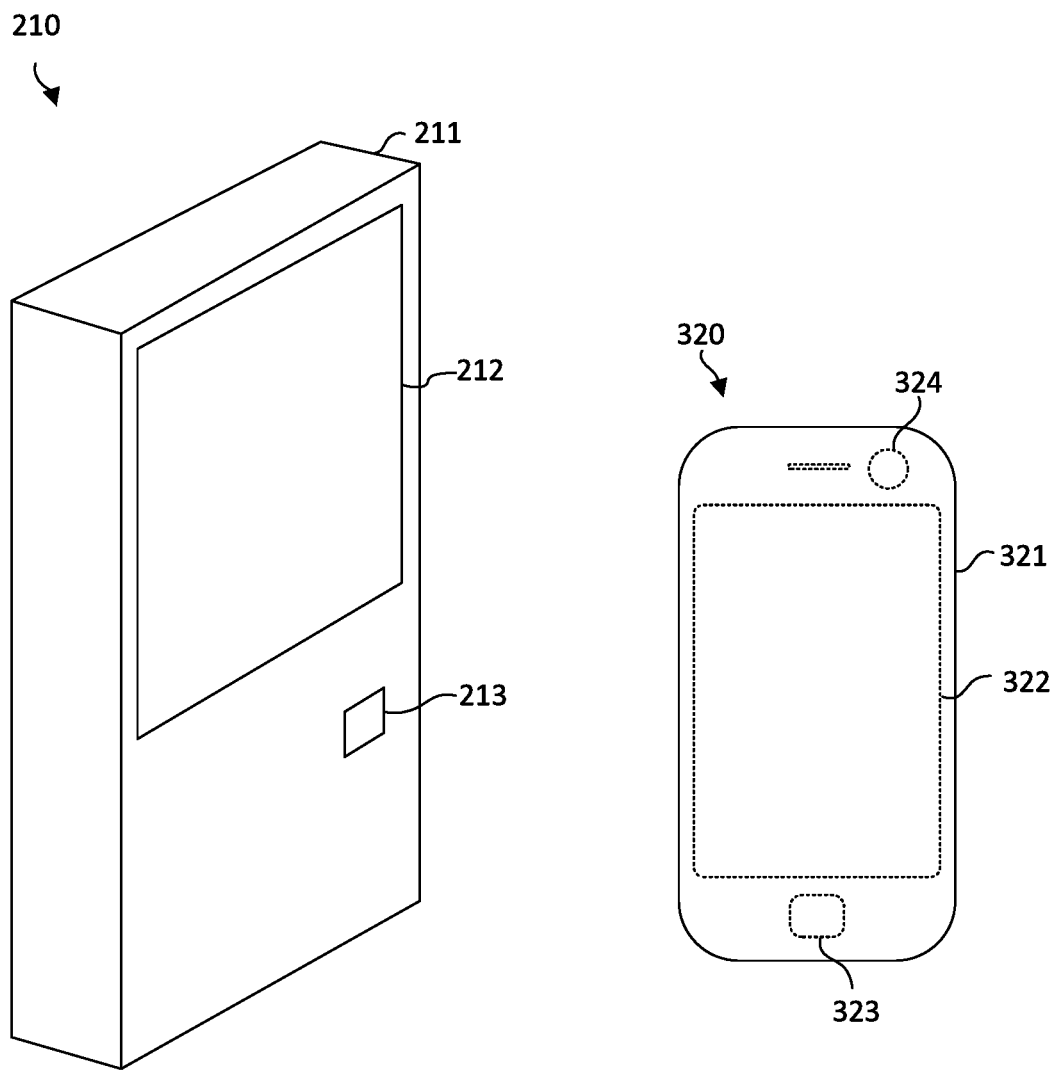
FIG. 3A is a schematic illustration of an interactive public display device in accordance with an embodiment.
FIG. 3B is a schematic illustration of a mobile device for running a mobile wayfinding application in accordance with an embodiment.

With reference to FIG. 3A, an exemplary embodiment of the interactive public display device 210 is designed as a free-standing kiosk. The interactive public display device 210 includes an enclosure 211, i.e., a housing, a touch-screen display 212 supported by the enclosure 211, a synchronization feature 213 on the enclosure 211, as well as a processor (not shown), memory (not shown), and a network interface card (not shown) within the enclosure 211. In the illustrated embodiment, the touch-screen display 212 has a substantially vertical orientation, which allows an additional display to be included on an opposite side of the interactive public display device 210. In other words, a non-interactive public display device may be integrated with the interactive public display device 210.

With reference again to FIG. 2, the interactive public display device 110 runs a public wayfinding application, which may be a web wayfinding application 150 running in a web browser and hosted by the common backend system 102, or a native application stored in the memory of the interactive public display device 110. The interactive public display device 110, running the public wayfinding application, presents a public user interface, which is adapted for simultaneous viewing by multiple users, on its display. The interactive public display device 110 displays information relating to the facility and the facility units, including wayfinding information, via the public user interface, and receives user requests for such information via the public user interface.

The wayfinding information that is displayed includes a facility map 182 showing the facility units. The facility map 182 illustrates the layout of the facility units within the facility, facilitating navigation through the facility. The wayfinding information may also include routes from a start location to a destination location on the facility map 182 and, optionally, corresponding directions. Typically, the wayfinding information further includes a facility directory listing the facility units. The facility directory lists the facility units by name in an organized manner, e.g., alphabetically, by category, and/or by location.

The representation of the wayfinding information in the public user interface, in one aspect, is optimized for public viewing. Typically, the whole facility map 182 or a complete floor of the facility map 182, i.e., a floor map, is displayed on a single screen of the public user interface. When the facility has more than one floor, the public user interface may cycle through multiple floor maps over time, using suitable navigation features associated with the wayfinding information. Preferably, a whole facility map 182 or floor map is always displayed, even while a user is interacting with the interactive public display device 110, so that other users may use the map for navigation.

Typically, the whole facility directory or a complete category of the facility directory, i.e., a directory category, is displayed on the same screen of the public user interface. When the directory is organized by category, the public user interface may cycle through multiple directory categories over time. Preferably, a whole facility directory or directory category is always displayed, even while a user is interacting with the interactive public display device 110, so that other users may use the directory for navigation. Also preferably, the facility units are labeled with an identifier on the facility map 182 and listed with the same identifier in the facility directory.

A user request for wayfinding information involves a user selection of a facility unit as a destination location, via the public user interface. Typically, the user selection of a facility unit as a destination location is received by detecting a user touch on a facility unit on the facility map 182, i.e., an interactive facility map 182, or in the facility directory, i.e., an interactive facility directory, displayed on a touch-screen display. Alternatively, the user selection may be received from a separate input device, e.g., a touchpad, one or more keys, and/or a keyboard. The facility unit selected as the destination location is highlighted on the facility map 182, and a route from the interactive public display device 110, as the start location, to the facility unit selected as the destination location is displayed on the facility map 182.

Optionally, corresponding point-to-point directions may be displayed along with more detailed map views on the same screen of the public user interface. Typically, additional information relating to the facility unit selected as the destination location is also displayed, such as a profile, a photograph, directory information, e.g., a phone number and/or an address, services or services providers associated with the destination location, opening hours, event information, promotional information, e.g., an advertisement and/or a marketing message, and/or a promotional item, e.g. a digital coupon.

In some instances, a user selection of a directory category may also be received. Typically, the user selection of a directory category is received by detecting a user touch on a heading of the facility directory. Alternatively, the user selection may be received from a separate input device, e.g., a touchpad, one or more keys, and/or a keyboard. When a directory category is selected, those facility units categorized as belonging to that directory category are displayed. For example, a user may select the directory category "shoes", and those facility units categorized as shoe stores may be displayed.

Accordingly, the public user interface has a selection state including a user selection of a destination location and, in some instances, a user selection of a directory category. Preferably, the public user interface has a selection state including at most two user selections, i.e. at most two layers of statefulness relating to user selections.

The interactive public display device 110 may also display real-time notifications, e.g., notifications of events, notifications of promotions, and/or alerts.

The non-interactive public display device 140 is physically similar to the interactive public display device 110, but lacks user interactivity. In general, the non-interactive public display device 140 includes a non-touch display, e.g., a standard LCD display. The non-interactive public display device 140 may be installed as a free-standing unit or may be integrated with the interactive public display device 110. For example, a non-interactive public display device 140 may be integrated with the interactive public display device 210 of FIG. 3A, sharing the same enclosure 211, processor, memory, and network interface card. The non-interactive public display device 140 displays wayfinding and/or promotional information, typically, a static facility map 182, a static facility directory, and/or an advertisement.

Like the interactive public display device 110, preferably, the non-interactive public display device 140 is provided with an identifier which uniquely identifies the interactive public display device 140, and includes a synchronization feature encoded with the identifier, e.g., a QR code or an NFC tag referencing the physical location of the non-interactive public display device 140.

The mobile wayfinding application 120 runs on a mobile device, which is a handheld, portable computer device, such as a mobile phone, e.g., a smartphone, a personal digital assistant (PDA), or a tablet computer. In addition to a processor, memory, and a network interface card, the mobile device includes a display and, preferably, also includes a synchronization device.

The display of the mobile device is a small-screen display adapted for personal viewing. For example, the display may have a diagonal screen size of less than 15" (38 cm). Typically, the display is a touch-screen display. In some instances, the mobile device may include a separate input device, e.g., a touchpad, one or more keys, and/or a keyboard, in addition to or instead of a touch-screen display.

Typically, the synchronization device is a scanning, i.e., reading, device, and the mobile device is configured to scan the synchronization feature, in order to read the synchronization feature. For example, the synchronization device may be a camera, an NFC transceiver, a Bluetooth transceiver, or a Wi-Fi transceiver. In some instances, the mobile device may include multiple synchronization devices of different types. For example, the mobile device may include both a camera and an NFC transceiver.

With reference to FIG. 3B, an exemplary embodiment of the mobile device 320 is a conventional smartphone. The mobile device 320 includes a housing 321, a touch-screen display 322 supported by the housing 321, and a home key 323 on the housing 321, as well as a processor (not shown), memory (not shown), a network interface card (not shown), and a synchronization device 324, e.g., an NFC transceiver, within the housing 321.

With reference again to FIG. 2, the mobile wayfinding application 120 is, typically, a native application stored in the memory of the mobile device and running in the operating system of the mobile device. In general, different versions of the mobile wayfinding application 120 are written for different mobile platforms, in the appropriate languages, using the appropriate software development kits (SDKs) and frameworks.

The mobile device, running the mobile wayfinding application 120, presents a mobile user interface, which is adapted for viewing by a single user, on its display. The mobile user interface and the public user interface have similar appearances, functions, and features, so that users are able to easily transition between the user interfaces. The mobile device displays information relating to the facility and the facility units, including wayfinding information, via the mobile user interface, and receives user requests for such information via the mobile user interface.

The wayfinding information that is displayed via the mobile user interface on the mobile device is, generally, the same as that displayed via the public user interface on the interactive public display device 110, but the representation of the wayfinding information in the mobile user interface is optimized for personal viewing on a small-screen display, rather than public viewing on a large-screen display. The mobile user interface offers additional content, and additional levels of screens, menus, and interactions.

Typically, a list of multiple facilities is displayed on an initial screen of the mobile user interface. A user selection of a facility is received by detecting a user touch on a touch-screen display or from a separate input device. A facility map 182, a facility directory, and facility events or other information associated with the selected facility may then be accessed.

Typically, the facility map 182 or a portion thereof is displayed on a single screen of the mobile user interface, and the facility map 182 may be manipulated through finger gestures. For example, the facility map 182 may be moved by a single-finger gesture, or magnified or reduced by a two-finger gesture. Preferably, the facility units are displayed with markers, which allow a user selection of a facility unit to be made by a single-tap gesture on the corresponding marker. Typically, the facility directory or a portion thereof is displayed on a different screen of the mobile user interface, and the facility directory may be manipulated through finger gestures. For example, the facility directory may be scrolled by a single-finger gesture.

A user request for wayfinding information involves a user selection of a facility unit as a destination location, via the mobile user interface. Typically, the user selection of a facility unit as a destination location is received by detecting a user touch on a facility unit on the facility map 182 or in the facility directory displayed on a touch-screen display. Alternatively, the user selection may be received from a separate input device, e.g., a touchpad, one or more keys, and/or a keyboard. The facility unit selected as the destination location is highlighted on the facility map 182.

Typically, additional information relating to the facility unit selected as the destination location is also displayed, such as a profile, a link to a webpage or a social media page, a photograph, directory information, e.g., a phone number and/or an address, opening hours, event information, promotional information, e.g., an advertisement and/or a marketing message, and/or a promotional item, e.g., a digital coupon. Additionally, information generated by other people, e.g., friends on social media sites, or friends from within the mobile wayfinding application 120, may be displayed in the mobile user interface. Preferably, each facility unit has its own profile page where the additional information may be accessed.

For routing to the facility unit selected as the destination location without synchronizing the mobile device, a user selection of a facility unit as a start location is also received, via the mobile user interface. Typically, the user selection of a facility unit as a start location is received by detecting a user touch on a facility unit in the facility directory displayed on a touch-screen display or by searching for an alphanumeric string, e.g., by using a real-time intelligent search, input from an on-screen or physical keyboard. A route from the facility unit selected as the start location to the facility unit selected as the destination location is then displayed on the facility map 182. Optionally, corresponding point-to-point directions may also be displayed. For example, the point-to-point directions may be accessed by sliding between points on a progress bar displayed below the facility map 182. As each point is reached, a corresponding step is illustrated on the facility map 182 and also displayed as text.

Preferably, the wayfinding system 100 allows a user to synchronize or "sync" their mobile device, running the mobile wayfinding application 120, with the interactive public display device 110. For example, a user may use a synchronization device on their mobile phone to interface with a synchronization feature on the interactive public display device 110. Preferably, the mobile wayfinding application 120 includes an in-app reader/scanner.

Upon synchronization, the start location is updated to the interactive public display device 110, and the destination location is updated to a facility unit selected on the interactive public display device 110. In general, the selection state of the mobile wayfinding application 120 is updated to the selection state of the interactive public display device 110. In other words, the mobile wayfinding application 120 reflects what is displayed and selected on the interactive public display device 110. Thus, the mobile wayfinding application 120 does not have to rely on signal-based localization of the mobile device for routing and does not have to rely on printouts to provide a record of wayfinding information.

In some embodiments, port keys or URLs may be used to facilitate synchronization between the interactive public display device 110 and the mobile wayfinding application 120. When directions are shown on the interactive public display device 110, a button is presented for the user to synchronize the directions to the mobile device. The user then may click or press that button. The interactive public display device 110 may send a request signal to the common backend system 102 to create a port key by passing in parameters such as the public display device ID, and an identifier corresponding to the location that the user wants to go. The common backend system 102 then uses this information, generates a short URL, and passes it back to the interactive public display device 110. The interactive public display device 110 can then decide to display this encoded URL as a QR code, enable scanning via NFC, or even expose the encoded URL as a beacon. The user then uses the mobile device to scan this code with any given QR code scanner, NFC reader, or beacon software. The mobile device then processes that URL and launches the mobile wayfinding application 120. Once the application is running, the application will then communicate with the common backend server 102 via the URL to retrieve details about what the user intends to do. In this case, the intention is to show a path or direction from the location of public display device to the location the user has selected. The mobile wayfinding application 120 will then load the correct map, and draw the appropriate path between the public display device and the selected location.

For example, if a shopper at a mall uses the interactive public display device 110 to select a particular store, and to obtain a route to the store and other relevant information about the store, the shopper can synchronize their mobile phone with the interactive public display device 110 to load the same route and information into the mobile wayfinding application 120. Optionally, upon synchronization, the mobile device may also receive a promotional item, e.g., a digital coupon, displayed on the interactive public display device 110. Or the mobile device may receive additional information associated with the destination location.

In some instances, the mobile device, running the mobile wayfinding application 120, may be synchronized with the non-interactive public display device 140 in a similar manner to update the start location to the non-interactive public display device 140.

Figure 4:
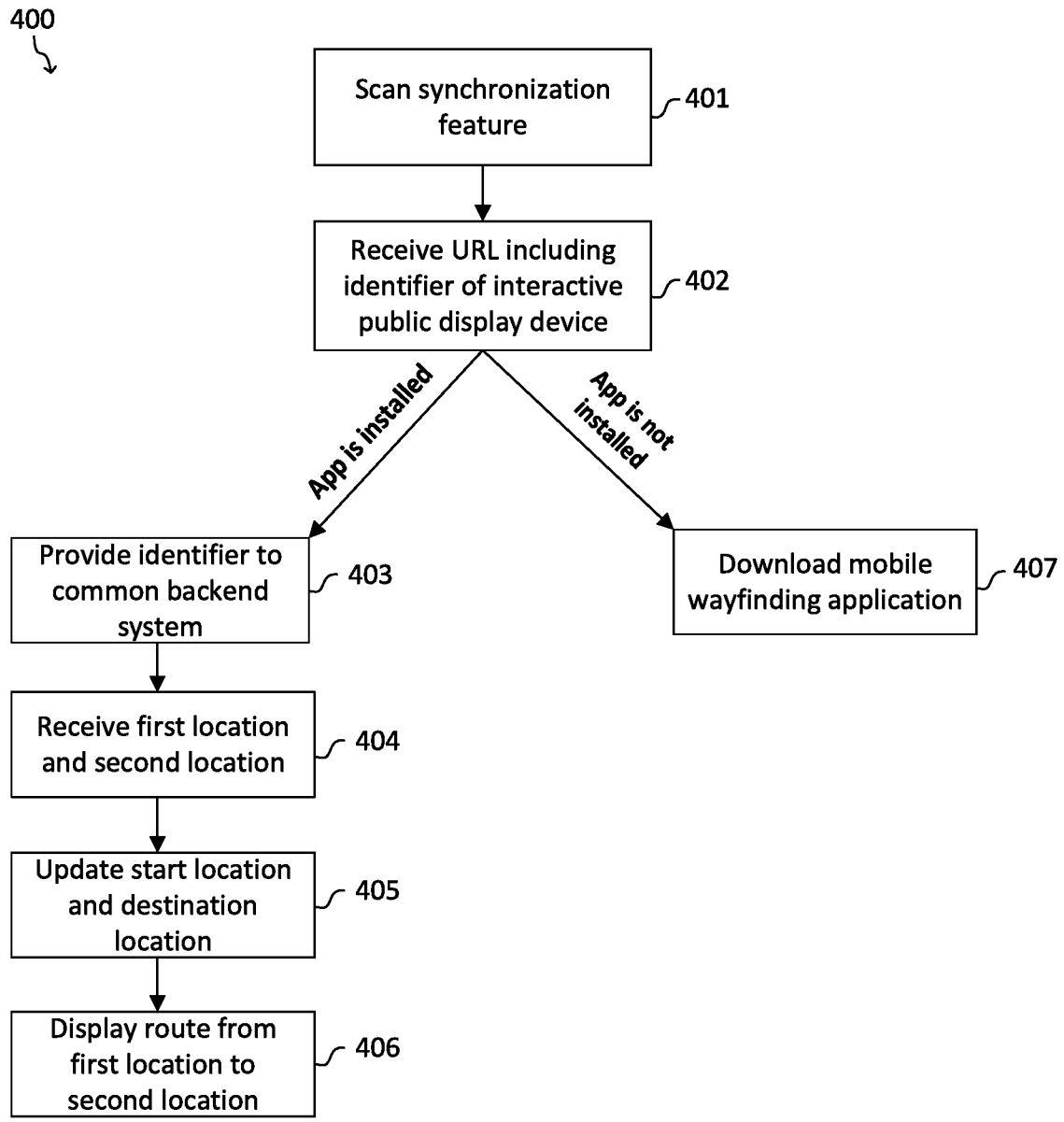
FIG. 4 is a flow diagram of a synchronization method in accordance with an embodiment.

With reference to FIG. 4, in an exemplary embodiment of a synchronization method 400, a mobile device scans a scannable synchronization feature on an interactive public display device 110, by means of a scanning device, in a first step 401. The interactive public display device 110 is located at a first location within a facility and has been used to select a facility unit as a second location, i.e., has a current selection state including a user selection of the second location. Accordingly, the interactive public display device 110 displays a route from the first location to the second location, via the public user interface. In a second step 402, the mobile device receives a unique URL including an identifier of the interactive public display device 110.

If the mobile device already has the mobile wayfinding application 120 installed, the mobile device provides the identifier to the common backend system 102, via the URL, in a third step 403. In return, the mobile device receives the first location and the second location from the common backend system 102, in a fourth step 404. In a fifth step 405, the mobile device updates its start location to the first location and its destination location to the second location in the mobile wayfinding application 120. Accordingly, the mobile device displays the route from the first location to the second location, via the mobile user interface, in a sixth step 406.

If the mobile device does not have the mobile wayfinding application 120 installed, the URL directs the mobile device to download the mobile wayfinding application 120 from an application store, in an alternative step 407.

The mobile device may also display real-time notifications, e.g., notifications of events, notifications of promotions, and/or alerts.

With reference again to FIG. 2, the web wayfinding application 150 runs in a web browser on a computer device, e.g., a desktop computer or laptop computer, and is hosted by the common backend system 102. The web wayfinding application 150 is generally similar to the mobile wayfinding application 120, but is designed for a standard computer device, rather than a mobile device. Accordingly, the representation of the wayfinding information is optimized for personal viewing on a standard-screen non-touch display. User selections are received from an input device, e.g., a mouse or a keyboard.

The content and analytics dashboard 130 is, typically, a web application running in a web browser on a computer device, e.g., a desktop computer or laptop computer, and hosted by the common backend system 102. The content and analytics dashboard 130 is a management application, which allows authorized users, e.g., facility managers, to manage and administer the wayfinding system 100. Advantageously, by using the content and analytics dashboard 130, authorized users are able to manage and administer all of the user-facing components 101 in one place and at the same time.

The content and analytics dashboard 130 includes a content module, which enables authorized users to update content stored in the CMS 160 in the common backend system 102. Information relating to the facility and the facility units can easily be accessed and changed, e.g., revised, added, or removed. Updates are pushed to the interactive public display device 110, the mobile wayfinding application 120, and the web wayfinding application 150 in real time. For example, a hospital administrator may use the content and analytics dashboard 130 to update contact information for a hospital department on all interactive public display devices 110 situated within the hospital and on all versions of the mobile wayfinding application 120.

The content and analytics dashboard 130 also includes an analytics module, which enables authorized users to receive and view analytics from the analytics database system 170 in the common backend system 102. Analytics relating to user interactions with the interactive public display device 110, the mobile wayfinding application 120, and the web wayfinding application 150, e.g., user selections or "hits", searches, dates, types of mobile device, and/or movement patterns represented as heat maps, may be accessed and viewed in real time. In particular, heat maps may be generated manually within the analytics database system 170 or by the GIS 180, by plotting individual paths taken by each user and overlaying color values onto the plot based on the number of overlaid paths.

Figure 5A:
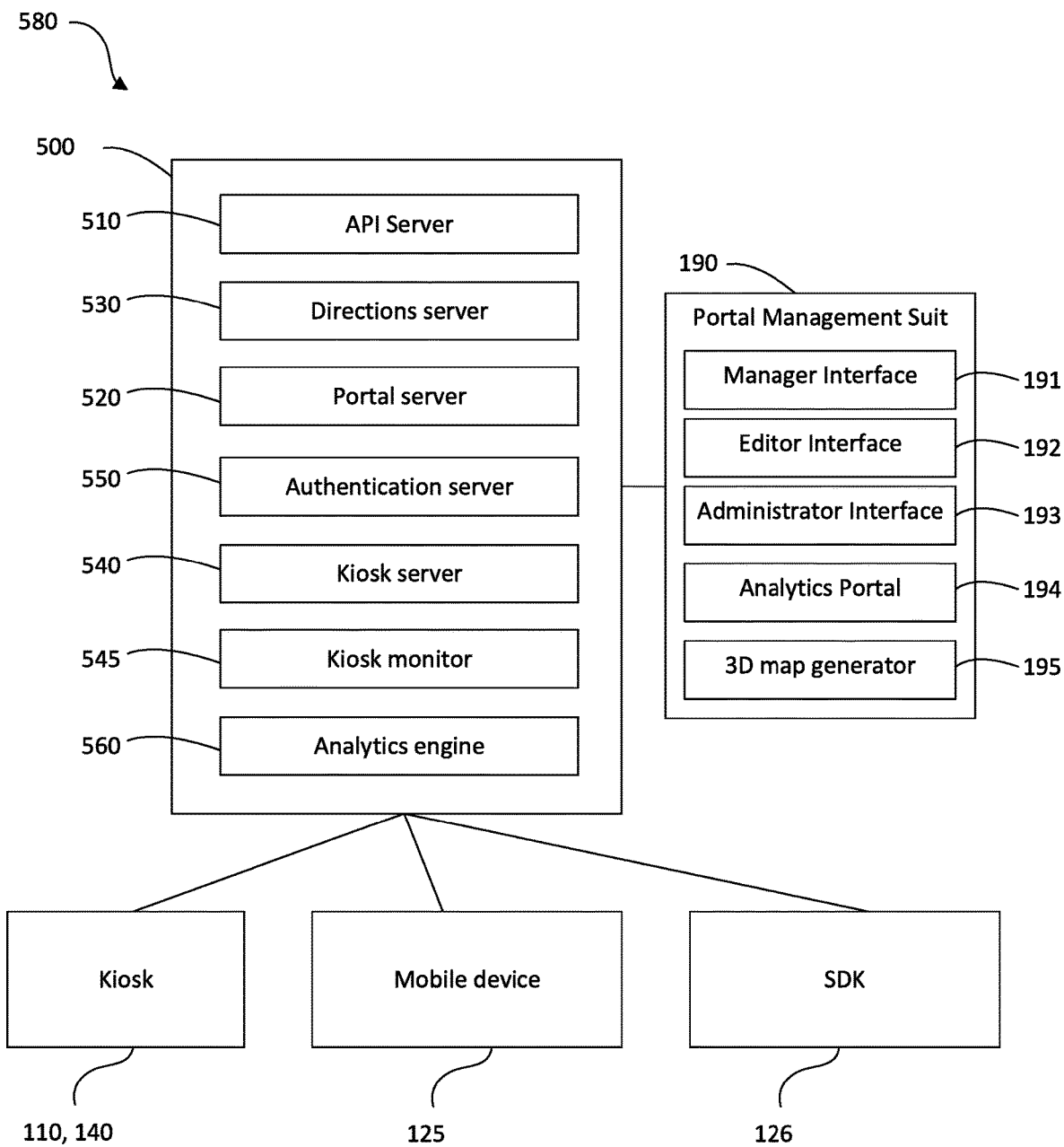
FIG. 5A is a block diagram of a wayfinding system, in accordance with an embodiment.

In some embodiments, the content and analytics dashboard 130 may be accessed via portal management suite 190 (see e.g. FIG. 5A).

Typically, the analytics describe and compare user interactions by facility unit, e.g., hits per facility unit, or by directory category, e.g., hits per category, over a particular time period, e.g., in tables, charts, and/or graphs. The analytics may be received in the form of a report, e.g., a monthly report or an on-demand report. For example, a hospital administrator may use the content and analytics dashboard 130 to view heat maps of visitor/patient movement. For another example, a mall manager may use the content and analytics dashboard 130 to query how many shoppers selected a particular store or searched for washrooms by using a particular type of mobile device over a particular time period.

The common backend system 102, typically, includes multiple backend devices, e.g., servers. Typically, the common backend system 102 includes at least a database server and a hosting server. In some instances, the common backend system 102 also includes a content distribution network (CDN) 570 (see e.g. FIG. 5B). The CMS 160 and the analytics database system 170 may be hosted by the common backend system 102. The GIS 180 may be hosted internally by the common backend system 102 or supplied externally.

In some embodiments, the CMS 160 may be a frontend interface application, typically, implemented as a web service. CMS 160 may communicate with GIS 180, which then modifies the database. In this case, GIS 180 may be an Application Program Interface (API) which manipulates the database.

In some embodiments, CMS 160 stores content, including information relating to the facility and the facility units, handles updates to the content received from the content and analytics dashboard 130, and provides the content to the interactive public display device 110, the mobile wayfinding application 120, and the web wayfinding application 150. For example, the CMS 160 may be a no structured query language (NoSQL) database application. The content stored in the CMS 160 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 183 stored in the GIS 180. This allows larger, less frequently accessed files to be stored in the CMS 160, rather than the GIS 180.

The CMS 160 also stores the identifier of the interactive public display device 110 together with the location of the interactive public display device 110, and the current selection state of the interactive public display device 110. Typically, the CMS 160 stores identifiers, locations, and current selection states for multiple interactive public display devices 110. In some instances, the CMS 160 also stores identifiers and locations for multiple non-interactive public display devices 140.

Figure 5B:
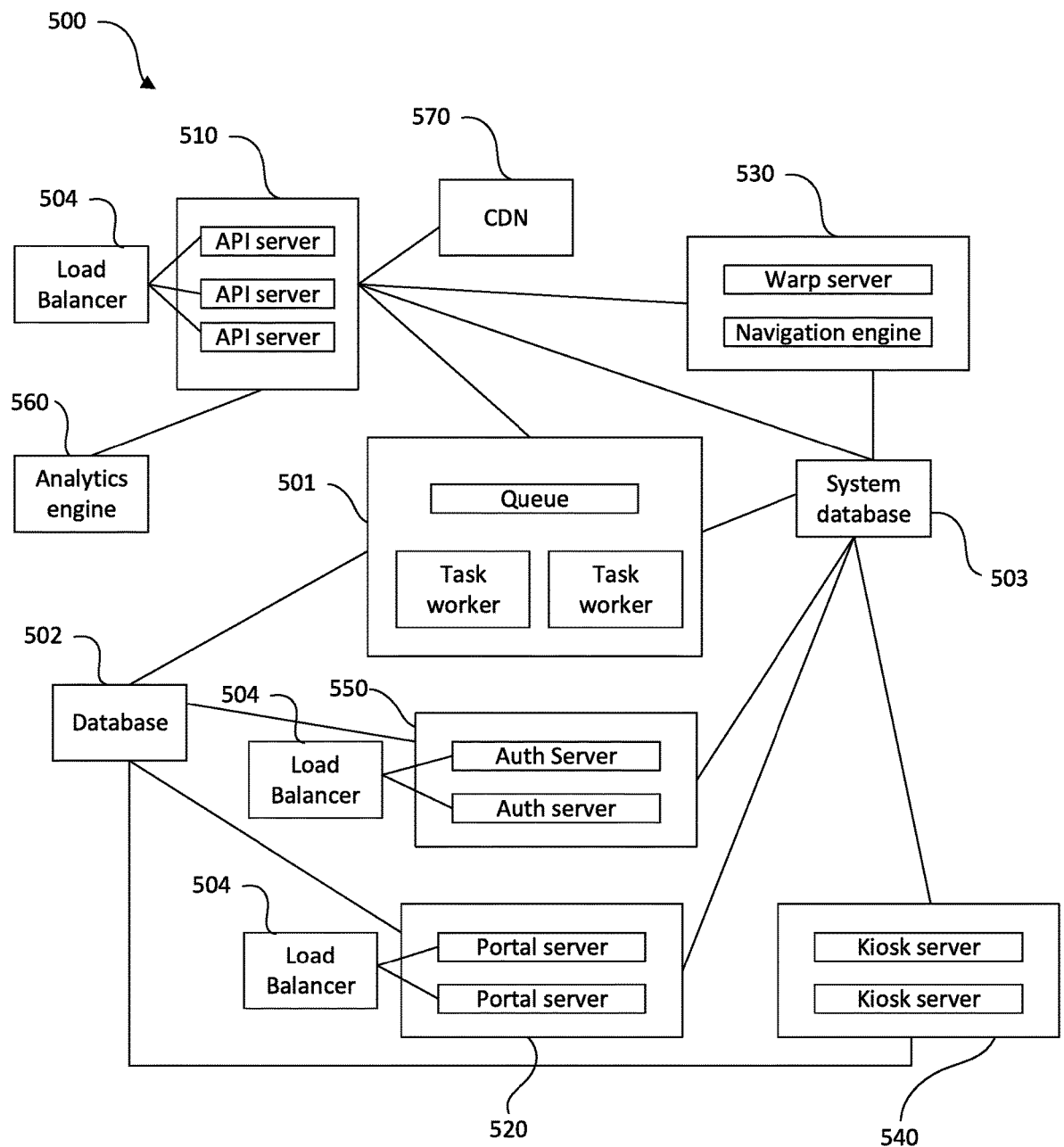
FIG. 5B is a block diagram of a server platform of the wayfinding system of FIG. 5A.

In some embodiments, the analytics database system 170 includes or is operatively connected to an analytics engine 560 (see e.g. FIG. 5B).

When a mobile device, running the mobile wayfinding application 120, sends an identifier of an interactive public display device 110 to the common backend system 102 upon synchronization with that interactive public display device 110, the identifier is received by the CMS 160. The CMS 160 uses the identifier to identify the interactive public display device 110, typically, among the multiple interactive public display devices, and to retrieve the location and the current selection state for the interactive public display device 110. The CMS 160 then provides the location and the current selection state of the interactive public display device 110 to the mobile device, which updates its location and selection state accordingly. Typically, the selection state includes a user selection of a destination location.

The analytics database system 170 may be a database application, typically implemented as a web service. The analytics database system 170 stores all user interactions with the interactive public display device 110, the mobile wayfinding application 120, and the web wayfinding application 150, e.g., user selections or "hits", searches, dates, types of mobile device, and/or movement patterns represented as heat maps, in real time, and generates analytics relating to the user interactions. Advantageously, because user interactions are recorded for several different user-facing components 101, a relatively large sample size is obtained. The large sample size may allow analytics engine 560 to plot heat maps that are useful for users and to provide suggestions to improve user experience.

For example, in a theme park, every search and every click that the user performs on the mobile device may be tracked and recorded, along with the user's position via positioning technologies. The recorded data may be used to determine what the popular rides are, or what an average or peak wait time is for each ride. Based on the determined data, suggestions for alternative rides may be made to users. In addition, optimum routes may be calculated and recommended for a user to go to some or all of the rides that he would like to go. Heat maps can also be plotted to help facility managers figure out hot spots, so that they can plan accordingly. Similarly, in a mall, user search or routing data may be recorded and collected, then analytics may be generated, to determine the busiest part(s) of the mall, and provide suggestions to facility managers to better run their venue. The same analytics data may be used to improve public display device or mobile experience. That is, analytics engine 560 may be configured to modify the public user interface on the display of the public display device or the mobile user interface on the display of the mobile wayfinding application in order to provide a better user experience based on analytics data.

For example, the analytics engine 560 may determine a most popular or visited store at different times throughout the day. If a user visits the mall in the morning, a popular coffee shop may be automatically displayed to the user on the kiosk or the mobile application.

In another example, the analytics engine 560 may, based on past search or routing data from the same user, determine that a user tends to visit a certain restaurant on weekends, and then the kiosk or the mobile application may be updated to show the same user the most optimum route, or a current promotion, at that restaurant when the user visits the mall.

In some embodiments, user interactions are stored in a raw format and pre-set metrics are passively generated. For example, all hits on the interactive public display device 110 and the mobile wayfinding application 120 at a mall may be recorded, and a table listing the number of hits per store in the current month may be generated, for viewing in the content and analytics dashboard 130.

The GIS 180 is, typically, a representational state transfer (REST)-ful application programming interface (API). The GIS 180 includes routing algorithms 181, facility maps 182, and facility metadata 183. The GIS 180 may store the facility maps 182 and the facility metadata 183, handles updates to the facility maps 182 and the facility metadata 183, and provides the facility maps 182 and the facility metadata 183 to the interactive public display device 110, the mobile wayfinding application 120, and the web wayfinding application 150. Typically, the GIS 180 serves the facility maps 182, e.g., as PNG files, and the facility metadata 183, e.g., as JSON/XML files, over the web. The facility metadata 183 is customizable for the type of facility, and may include digital representations of paths, polygons encapsulating facility units, nodes corresponding to facility locations, identifiers for each facility unit, and qualitative metadata, such as the type of path, e.g., hallway or dirt trail.

The GIS 180 also uses the routing algorithms 181 to calculate routes and provides the routes to the interactive public display device 110, the mobile wayfinding application 120, and the web wayfinding application 150. Typically, the routing calculations output a JSON/XML list of node or polygon identifiers representing a complete path, which the interactive public display device 110, the mobile wayfinding application 120, and the web wayfinding application 150 will interpret and display. The output may also include points of interest and other facility metadata 183, such as total estimated travel time based on type of path and real-time traffic, as described herein.

In accordance with one or more aspects of the present disclosure, public display devices (referred to also as "kiosks") 110, 140 may be efficiently managed and run both online and offline. The kiosks 110, 140 may create a simple navigation tool that engages visitors as they seek out more information about the venue. Each interface may be carefully designed with a focus on the user experience. Designs can be adapted to each venue's brand and specific needs, providing a unique interface with no disruption to the user experience. In addition, kiosk software can be installed on a custom-made hardware or on any hardware that meets essential requirements.

The mobile wayfinding application 120 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

Together, the kiosks 110, 140 and mobile wayfinding application 120 may provide a complete solution within a venue or facility. Visitors may use the kiosks to discover directions and scan information directly to their mobile device 320. This provides facilities with multiple touch points for visitor engagement, while delivering a seamless experience to the end-user.

Figure 8A:
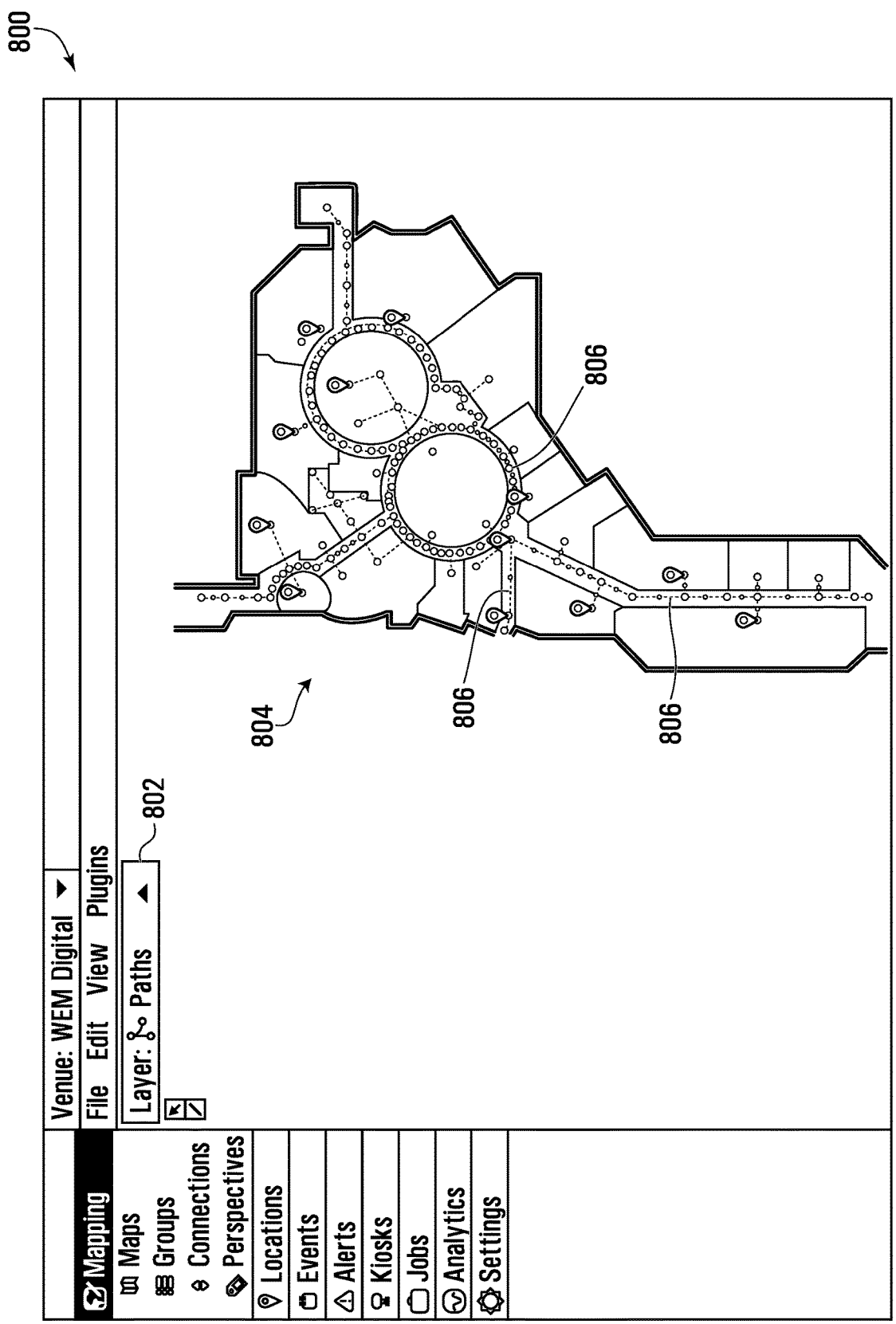
FIGS. 8A to 8E demonstrate various aspects of creating layers for a 3D map using a portal interface.

Portal management suite 190 allows venues to quickly and easily update both the kiosks 110, 140 and mobile device 320 from a centralized dashboard. The portal manager interface (as shown in FIG. 8A) may be accessible from any modern browser and updates instantly. This puts total control in the venue's hands to create, update and move locations; and manage details, dates and images for promotions and events.

In some embodiments, portal management suite 190 may receive a number of update requests along with content to be updated for one venue, and determine that there are ten or more kiosks 110, 140 to be updated within the same venue. The portal management suite 190 may intelligently determine, based on times of the day or day of the week, that the updates should occur overnight or during a time when the venue is closed. The portal management suite 190 may also determine, based on the current number of visitors at the venue, that portal management suite 190 may implement the updates at some or all of the kiosks 110, 140, based on concentration of visitors around each kiosk. In some embodiments, if the portal management suite 190 receives updates for a number of venues, it may implement the updates throughout a given period of time (e.g. 48 hours), such that the backbone network for transmitting the updates would be less impacted by the content update batches.

Wayfinding system 100 may provide analytics to aggregate data from each user to provide insight into visitor behavior within a venue. The wayfinding system 100 has the capability to capture user intent, which is normally quite difficult to measure without direct interaction with the end-user. By collecting information related to visitor intent, venues or facility owners may be able to make smart, educated decisions based on the realities of their facility.

Each kiosk 110, 140 and mobile device 320 may display a 3D map of a facility or venue. Pathways are drawn to ensure the optimal route is displayed; avoiding walls, doors and other indoor obstacles. Pathways can be customized by the venue to meet specific needs. Creating unique 3D features for each venue's map may allow for the addition of visual cues to assist users with indoor navigation.

In an example, if there are over a hundred kiosks 110, 140 in over fifty different locations, or over a thousand kiosks 110, 140 in over six hundred locations, it may not be feasible or efficient to change or update each kiosk's 110, 140 software or map by logging into each kiosk 110, 140 individually. Some embodiments provide a system wherein generation of or updates of 3D maps or other software components can be pushed in real time or near real-time, or on a pre-determined schedule, to one or more kiosks 110, 140 in different locations.

In some embodiments, the one or more kiosks 110, 140 may be each associated with a weight indicating a priority for maintaining or updating the kiosk 110, 140. For example, if a kiosk 110 is located in a high-traffic facility, then it may have a greater weight, or higher priority, to be updated more frequently when appropriate (e.g. when a map is updated). As another example, the weight may be determined based on at least one of the following factors: a priority of the kiosk, a data size of the at least one portion of the facility map 182, an area size of the facility map 182, a number of visitors at the facility associated with the kiosk, and so on.

In some embodiments, the updates are pushed to the kiosks 110, 140 in batches, at different times of the day, the week, the month, and so on, in order to minimize the impact on daily activities of users. For example, the updates may be scheduled at night or on weekends for an office building.

In some embodiments, once an update has been entered into CMS 160 via portal management suite 190 by a facility owner, the owner may choose to push the update to the kiosks 110, 140 at a suitable time, provided the owner has the proper security clearance in the system.

The updates may be stored in the cloud, or CMS 160, until the updates are pushed to the appropriate kiosks 110, 140. A backend server, such as the kiosk server 540, may deliver the updates to kiosks at the proper times. In some embodiments, a kiosk suite may be built in the CMS 160 prior to being pushed to a new kiosk (e.g. cloud initiation and configuration).

In some embodiments, kiosks 110, 140 may be run both online and offline.

In some embodiments, 3D maps may be generated or updated in a portal management suite 190 and pushed at the appropriate times to the appropriate kiosks 110, 140. For example, the generated 3D map or updates may be done via management suite portal 190, using a tool such as a 3D map generator, then stored in the CMS 160, then rendered in a browser and pushed to the kiosks 110, 140 at scheduled times, or in real time or near real-time.

FIG. 5A illustrates a wayfinding system 580 and FIG. 5B illustrates a server platform 500, in accordance with an embodiment. The system 580 provides and manages wayfinding applications on kiosks 110, 140 and mobile devices 125. The wayfinding system 580 may include the server platform 500 hosted in the cloud providing a plurality of services.

The server platform 500 may be implemented by system modules or engines such as API server 510, directions server or navigation engine 530, portal server 520, authentication server 550, a kiosk delivery or update services server 540 (e.g., ATLAS), a kiosk status monitoring module 545, and analytics engine 560. The server platform 500 may further include or connect to a portal management suite (or "portal") 190, kiosks 110, 140, mobile devices 125, and optionally, a developer SDK kit.

Figure 10A:
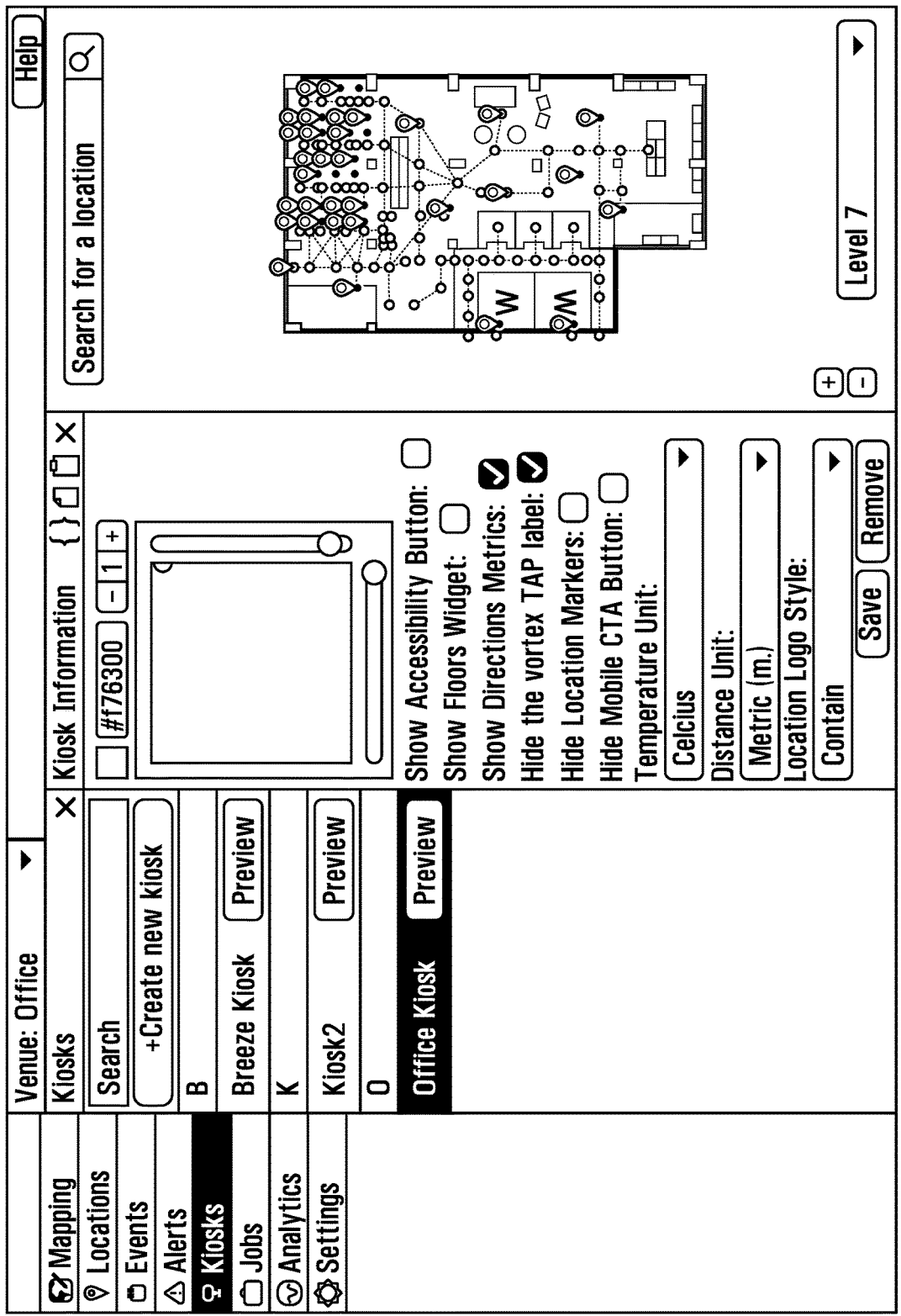
FIG. 10A shows an example user interface of a portal for managing kiosks.
Figure 10B:
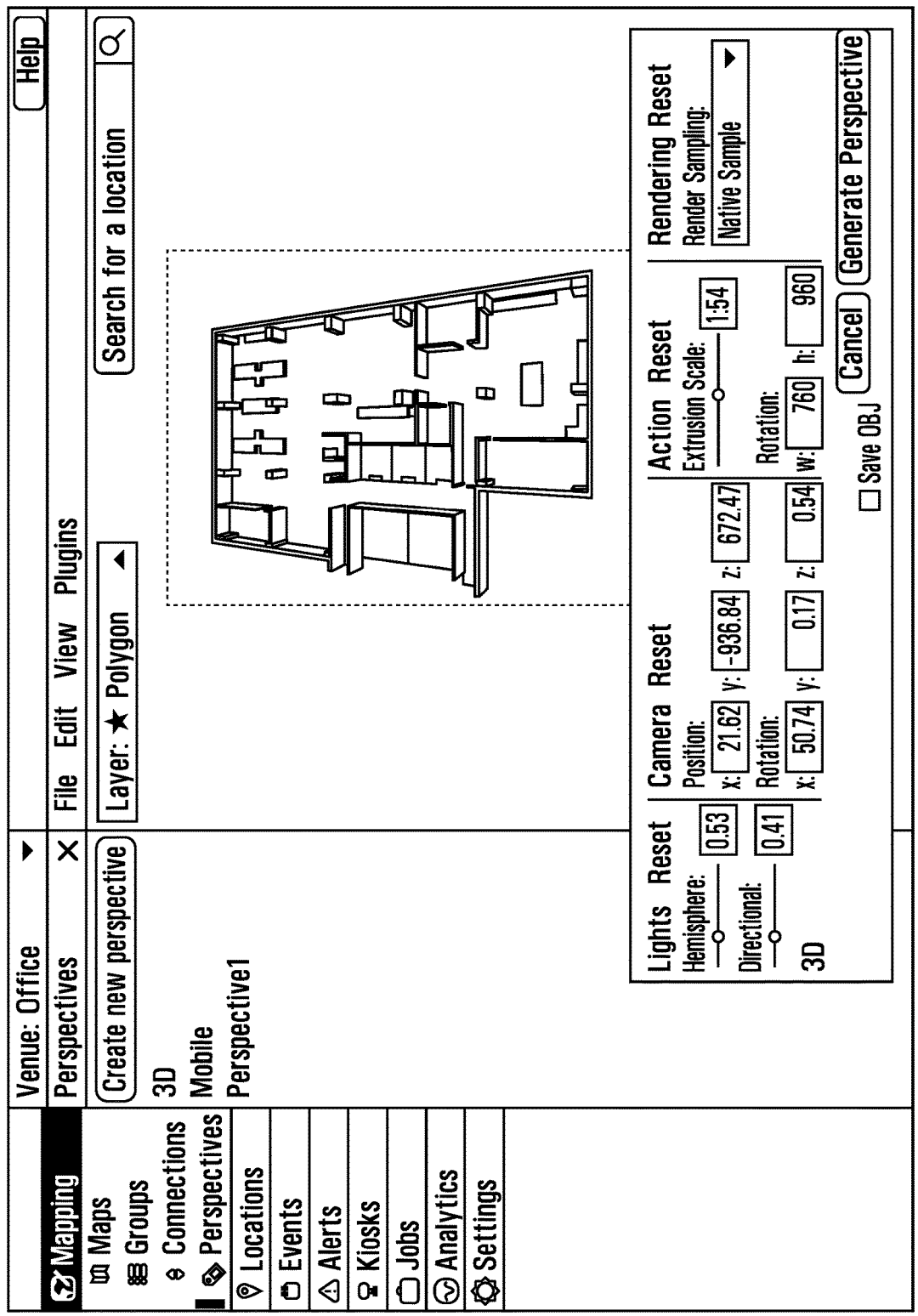
FIG. 10B shows an example user interface of a portal for editing 3D map.

Portal management suite 190 may provide a user interface generated and maintained by portal server 520. Example portal user interfaces are shown in FIGS. 10A and 10B. FIG. 10A demonstrates an example user interface of a user portal for creating a new kiosk. FIG. 10B shows an example user interface of a user portal for editing a 3D map where a user may create a new perspective.

The portal management suite 190 may provide generation and modification of building data with one tool via a web browser. The portal management suite 190 may include collaborative tools with secure user accounts and permissions, which may be managed by authentication server ("auth server") 550. The portal management suite 190 may include a plugin architecture and an API to integrate with other tools. The management suite 190 may also support functionality including a manager interface 191, an editor interface 192, an administrator interface 193, and an analytics portal 194.

The portal management suite 190 may include a 3D map generator 195 that is configured to generate a 3D map. The map generator 195 may generate the 3D map based on a 2D base map or file.

The system 580 may include a mobile software development kit (SDK) 126. The mobile SDK 126 may be for iOS, Android, and Blackberry. Some embodiments enable integration with some or all building information, and automatically generate turn-by-turn directions between locations. Some embodiments further include integrated proximity sensors (e.g. iBeacon™/Bluetooth™ low energy (BTE)).

Kiosks 110, 140 may be interactive or non-interactive. Kiosks may provide templates for many building types. Kiosks 110, 140 may be synchronized in real time or near real-time, or periodically, with building infrastructure data, as stored, for example, on CDN 570 or CMS 160.

The server platform 500 may provide and leverage data and insights to assist with leasing conversations for facility owners. The server platform 500 may also provide lifecycle data from first contact with a prospective tenant to updating the directory when the tenant moves in, from the portal management suite 190. The portal management suite 190 may improve efficiency, accuracy, and communication between the property manager and leasing manager.

Analytics engine 560 collects data relating to visitors' interests based, for example, on the types of locations visited, the time of day, season. Analytics engine 560 may also receive alerts with insights about trends or outliers. Based on the intelligence data, the wayfinding system 580 may optimize building performance, traffic flow, and improve the visitor's experience.

FIG. 5B illustrates the server platform 500 for providing and managing wayfinding applications on kiosks 110, 140 and mobile devices 125, 320. The server platform 500 includes one or more API servers 510, which may be connected to a Content Delivery Network (CDN) 570, one or more portal servers 520, one or more navigation engines 530, one or more ATLAS servers 540, one or more authentication servers 550, one or more analytics engines 560.

The server platform 500 may include a queue 501 having a queue and workers that perform various asynchronous tasks.

The server platform 500 may include at least one database 502 for storing data. The database 502 may be a session store for portal server 520, which can be used by the queue 501 to track tasks.

The server platform 500 may include a system database 503 for storing some or all of the system data. The system database 503 may be, for example, one or more MongoDB.

The server platform 500 may include at least one load balancer 504 for balancing data loads between servers.

API server 510 may be an OAuth 2.0 secured server providing and managing core functionalities of the platform server 500. API server 510 may be connected to the analytics engine 560 for receiving and managing intelligence reports.

Navigation engine 530 may include one or more components and functionalities of GIS 180 for calculating routes between a first and a second location. For example, navigation engine 530 may use routing algorithms 181 to calculate routes and provide the routes to the kiosks 110, 140, the mobile wayfinding application 120, and the web wayfinding application 150.

The routing calculations may be output in a format such as a JSON/XML list of node or polygon identifiers representing a complete path, which the kiosks 110, 140, the mobile wayfinding application 120, and the web wayfinding application 150 may interpret and display. Routing calculations may also include points of interest and other facility metadata 183, such as the total estimated travel time for a route based on, for example, the type of path and real-time traffic.

The navigation engine 530 determines whether that the shortest path by distance is not the most optimal path in a facility for a user. For example, in hospitals, there may be areas for which general foot traffic is not desirable or allowed, such as intensive care units or maternity wards. As another example, the shortest path by distance from room A to the cafeteria of a hospital involves using the service elevator, which is not meant for general use.

The navigation engine 530 may assign a wayfinding weight to one or more nodes or paths in a route. The navigation engine 530 may assign wayfinding weights to one or more nodes or paths during the generation of the facility map 182 or after the facility map 182 has been generated.

The wayfinding weight indicates that there is a cost or negative impact associated with using the node or path in the calculation of the route. The navigation engine 530 may determines the path with the lowest associated cost based on path distance and wayfinding weight.

The nodes and paths may have a default wayfinding weight, where the node or path has no cost associated with being used in a route calculation. The default wayfinding weight may be zero (0). The navigation engine 530 may increase or decrease the wayfinding weight. The wayfinding weight associated with nodes or paths may be increased to indicate that there is a higher cost associated with using the node or path in calculation of a route.

The nodes or paths may be assigned a deterrent wayfinding weight. The deterrent wayfinding weight indicates that the node or path should not be used in any routes (e.g., intensive care units). The deterrent wayfinding weight may be nine (9).

The nodes or paths may be assigned a desirable wayfinding weight. The desirable wayfinding weight indicates that routing traffic through the path or node is desirable. The desirable wayfinding weight may be a negative number (e.g., "−1"). For example, where a store has a promotion, the nodes or paths proximal to the store may be assigned a desirable wayfinding weight. The desirable wayfinding weight may direct user devices past or to the store.

The wayfinding weight may be assigned for a specific period of time. For example, where a store is having a promotion on a particular weekend, nodes or paths proximal to the store may be assigned a desirable wayfinding weight for that weekend. After the time period, the analytics engine 560 may determine a change in user device path for that time period as compared to other time periods where no desirable wayfinding weight was assigned to nodes or paths proximal to the store.

The setting or adjustment of wayfinding weights associated with each node or path in the facility map 182 may be done via portal 190 by facility owner or directly in the CMS 160 on the backend by a system administrator. For example, the wayfinding weights may be adjusted via an editor interface in portal 190, stored in CMS 160, and distributed to the appropriate kiosks 110, 140 at a suitable time.

The setting or adjustment of wayfinding weights may be pre-determined and pre-scheduled. For example, at the beginning of each month, a facility owner or administrator may enter, via the editor interface of portal 190, the scheduled information regarding promotions and roadblocks, if any, and associate the wayfinding weight with the appropriate nodes or paths at suitable dates and/or times.

The kiosk server 540 may include a kiosk application code delivery service and handle real-time or near real-time application updates. The kiosk server 540 may receive a command signal from portal server 520 to provide or update the facility map 182 at one or more of the plurality of public display devices or kiosks 110, 140 by selectively transmitting at least one portion of facility map 182 to one or more of the plurality of kiosks 110, 140.

In some embodiments, the kiosk server 540 is part of portal server 520. The kiosk server 540 may poll for or receive updated content (e.g. facility map 182) from CMS 160, and transmit the updated content to the appropriate kiosks 110, 140 accordingly.

Figure 7:
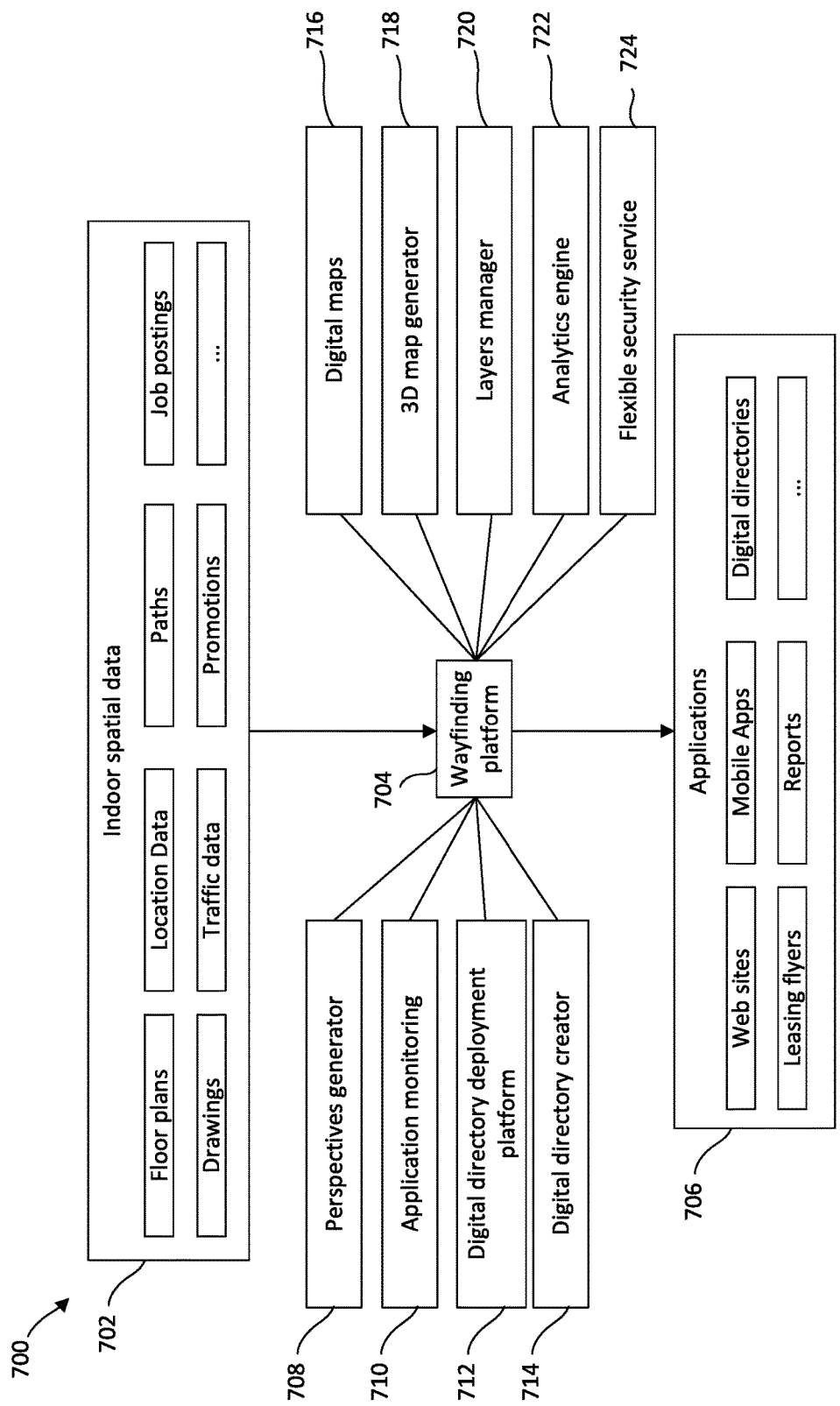
FIG. 7 is an example schematic illustration of indoor spatial data being used to generate various applications.

The server platform may include a digital directory deployment platform (such as digital directory deployment platform 712 of FIG. 7). The digital directory deployment platform enables the directory in each kiosk 110, 140 to download, update, and load automatically. The application may be web based and hosted in the cloud (e.g. CMS 160 and/or CDN 570). This enables the kiosks 110, 140 to run offline.

For example, the kiosk server 540 may be notified by portal 190 or CMS 160 whenever there is a new build or update for any software component or map for one or more kiosks 110, 140. The kiosk server 540 then notifies the kiosks 110, 140 that there is a new build or update available. The kiosks 110, 140 then schedule an appropriate time or times for the update.

In some embodiments, portal 190 or the kiosk server 540 selectively push at least one portion of the facility map 182 to one or more kiosks 110, 140 based on a weight associated with each of the kiosks 110, 140. The one or more kiosks are each associated with a kiosk weight indicating a priority for maintaining or updating the kiosk 110, 140. For example, if a kiosk 110 is located in a high-traffic facility, then it may be assigned a greater kiosk weight indicating a higher priority and is updated more frequently (e.g. when a map has been updated). As another example, the kiosk weight may be determined based on any one or more of: a priority of the kiosk, a data size of the at least one portion of the facility map 182, an area size of the facility map 182, a number of visitors at the facility associated with the kiosk, and so on.

The authentication server 550 may be an OAuth 2.0 compliant security server and is configured to protect all backend services of platform server 500. The authentication server 550 may authenticate administrators and users based on pre-set user groups or security settings.

Each user may be assigned a role with appropriate security credentials, such as an administrator, a venue or facility manager, and a venue or facility editor. The administrator device (e.g., administrator device 18) may be provided with higher security clearance in terms of accessing and updating data, and modifying settings. The venue or facility manager device (e.g., facility device 16) may be authorized to change venue and store description, logos and so on, but cannot alter facility map 182. The venue editor (e.g., facility device 16) may also be authorized to edit the facility map 182 for a kiosk 110, 140.

Store owners or store owner devices (e.g., store device 14) may be each assigned a user account or role that may allow a store owner to modify or alter data relating to their own store(s), across different kiosks or facilities. Additional rules may be enforced if desired. For example, a user may only access and/or change certain data pertaining to certain stores, and so on.

For example, the venue editor may log into portal 190, be authenticated by authentication server 550, make edits to the facility map 182 and save the map at different stages. The unfinished map may be saved by the server platform 500 in draft mode, where the server platform 500 will not publish the updated map until approved by administrator or facility owner. The server platform 500 may be configured to track approvals.

In some embodiments, an individual store can set up a promotion and send the promotion through the wayfinding system 580 to head office for approval or to mall management. The same can be done for job postings or advertisements, which facilitate self-management of the stores in a venue or facility.

Analytics engine 560 may collect telemetry data from kiosks 110, 140 and mobile devices 125, 320. Analytics engine 560 may comprise a processing engine that analyzes the telemetry data, generates data sets suitable for reporting, and displays the data sets as reports.

Analytics engine 560 may receive a heartbeat signal, or other signals, from mobile devices 125, 320 indicating a user's location, time associated with location, and other information.

Portal 190 may make use of content and analytics dashboard 130, which may enable authorized users to receive and view analytics from the analytics engine 560 and the analytics database system 170. Analytics relating to user interactions with the interactive public display device 110, the mobile wayfinding application 120, and the web wayfinding application 150 (e.g., user selections or "hits", searches, dates, types of mobile device, and/or movement patterns represented as heat maps) may be accessed and viewed in real time. In particular, heat maps may be generated manually within the analytics database system 170 or with GIS 180, by plotting individual paths taken by each user and overlaying color values onto the plot based on the number of overlaid paths.

Typically, the analytics engine 560 describes and compares user interactions by facility unit (e.g., hits per facility unit) or by directory category (e.g., hits per category), over a particular time period (e.g., in tables, charts, and/or graphs). The analytics data may be received in the form of a report, e.g., a monthly report or an on-demand report. For example, a hospital administrator may use the content and analytics dashboard 130 to view heat maps of visitor/patient movement. For another example, a mall manager may use the content and analytics dashboard 130 to query how many shoppers selected a particular store or searched for washrooms by using a particular type of mobile device over a particular time period.

In some embodiments, data may be analyzed in pre-determined intervals, and analytics engine 560 may mine through data that has been received during a pre-determined amount of time (e.g. past five hours or past two days), and process the data into a form that is presentable for users to view. For example, 1 million events may be consolidated into a hundred events. As another example, a daily report may be generated each day, or on the last day of the week. The consolidated and processed data may be sent for storage in analytics database system 170, which can cooperate with analytics engine 560 to generate intelligent reports. For example, a generated report may show a correlation between foot traffic and sales data for one or more stores or one or more venues. The analytics results may be built back into the platform and used to create personalized mapping, and generating insights on user or buyer behaviors.

Analytics engine 560 may be connected to the analytics database system 170, which may be a database application, typically implemented as a web service. The analytics engine 560 may receive and store all user interactions with kiosks 110, 140 the mobile wayfinding application 120, and the web wayfinding application 150. Because user interactions are recorded for several different user-facing components 101, a relatively large sample size may be obtained. Typically, user interactions are stored in a raw format and pre-set metrics are passively generated. For example, all hits on the interactive kiosks 110, 140, and the mobile wayfinding application 120 at a mall may be recorded, and a table listing the number of hits per store in the current month may be generated for viewing in the content and analytics dashboard 130.

In some embodiments, analytics engine 560 is configured to receive one or more signals from the mobile wayfinding application 120 on the mobile device 125, 320 to generate one or more reports regarding one or more of a plurality of facilities. In an example, the one or more signals comprise electronic data representative of one or more of the following: one or more user locations of a user of the mobile device, a time stamp associated with each of the one or more of user locations, one or more facility units visited by the user, the amount of time stayed within each of the one or more facility units, and identifiers of one or more public display devices used by the user.

CDN (Content Delivery Network) 570 may provide file storage and distribution for maps, images, and so on, and may include or be linked to CMS 160. Portal server 520 may access CDN 570 or CMS 160 via direct network connection or through API server 510.

Figure 6A:
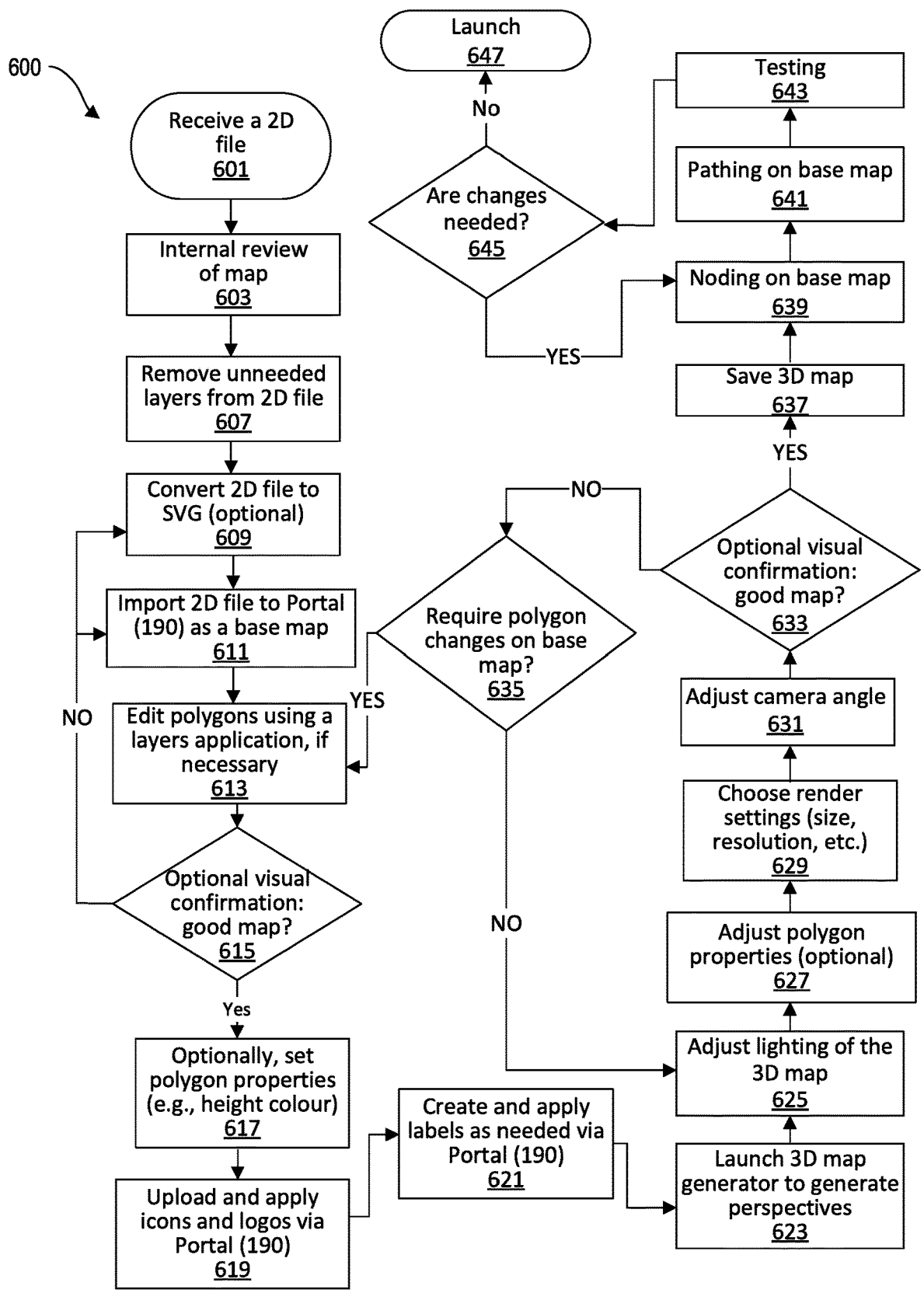
FIG. 6A is a flow chart of a method of creating a 3D map, in accordance with an embodiment.
Figure 6B:
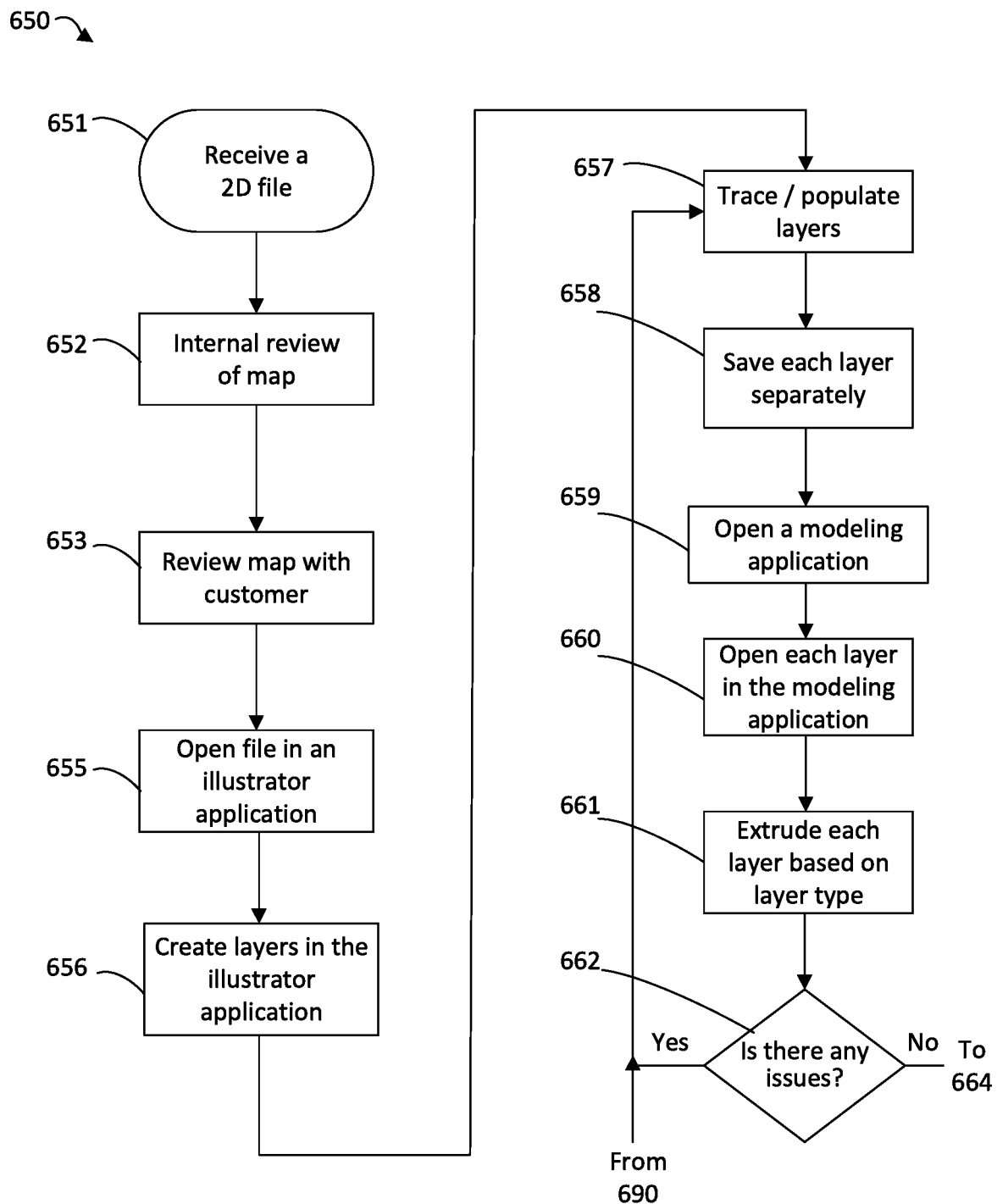
FIGS. 6B to 6E is a flow chart of a method of creating a 3D map in accordance with a further embodiment.

Turning now to FIG. 6A, illustrated therein is a method 600 for generating a three-dimensional (3D) map, in accordance with an embodiment. The method 600 transforms a 2D foundation into a 3D map for presenting a 3D view.

The method 600 may be performed by the system 580, and in particular enabled by the 3D map generator 195 of FIG. 5A. The method 600 to generate the 3D map begins with a floor plan of a facility. The floor plan can be converted into a 3D rendering using a cad file, PDF, JPG, or the like. The 3D map generator 195 may be provided within a web browser, as part of portal 190. The 3D map generator 195 may create maps based on a CAD file, which may not show key operational details such as the location of furniture or light fixtures.

The 3D map generator 195 may include a layers application (see e.g. FIGS. 8A to 8E). A layer application may facilitate creation of rooms and aisles as a layer, which can be rotated to select one or more perspectives for a layer. The 3D map generator 195 can provide for users to create simplified and intuitive maps.

The 3D map generator 195 can manipulate different shapes and different orientations in a map. For example, when a map is rotated, it may be desirable to keep logos and other peripheral information (e.g. information indicating features on the map) in an upright orientation. The 3D map generator 195 can provide a dynamic labels feature to achieve this.

As another example, a mall is likely to have various entrances, and so the 3D map may be oriented in different directions depending on the location of a particular kiosk 110, 140, assuming that a user facing that particular kiosk 110, 140 has entered into the mall through a certain entrance to which the particular kiosk 110, 140 is proximal. However, it may be inefficient to create a separate map for each possible orientation of the kiosk 110, 140. With the 3D map generator 195, once all relevant data has been entered into CMS 160 via portal 190, the 3D map generator 195 can apply one or more labels such that there is no manual requirement for rotating the map.

Each 3D map will includes a plurality of polygons defining different areas (e.g. facility units) on the map. For example, in a 3D map of a conventional shopping mall, polygons can represent different stores within the mall. Polygon definitions may be generated or chosen using the 3D map generator 195 and appropriate heights may be extruded based on certain factors.

Polygon height may be determined based on factors such as type, user input value, and/or default values. The polygons may then be rotated if necessary. The height of a polygon may be a relative height between different types of layers of polygons. For example, if the floor has a height of 0.5 units, then actual stores may have a height of 5 units. The heights may not be to scale, because different polygons may obstruct the view of walkways, thus preventing paths from being represented clearly. In general, heights may be artificially or manually set so that the map is visually appealing and understandable to the user, and the pathways are not obstructed.

With respect to polygon structures, user input or default settings may restrict the bounds of where a logo can be applied.

Perspectives may be automatically generated or set by the 3D map generator 195, which is configured to automatically determine orientation of maps and convert paths and points. With the 3D map generator 195, a user does not have to create nodes on paths for every orientation of the map—the user may only do it once and system may discern how to do it for other orientations and/or perspectives in a 3D environment. For example, FIG. 10B shows an example user interface of a portal for editing 3D map where a user may create a new perspective.

In addition, the 3D map generator 195 may be configured to allow some degree of tilting on a map, to give a sense of height and depth when a user or visitor interacts with the map.

In cases where maps contain outdoor elements such as campuses or outlet malls, street orientation as well as labels of street names may be automatically configured within 3D map generator 195, with appropriate street names applied automatically. In some embodiments, street orientations and street names may be entered manually.

Geo-referencing may be applied as well in generating the 3D map. Three or more corners or control points may be set on the map, and Cartesian coordinates (e.g. X-Y coordinates) of each of the control points may be convertible to corresponding longitudes and latitudes. This may allow the system to perform more accurate distance estimations when computing a path. In addition, travel time may be estimated in a more accurate manner with data gathered from a variety of sources such as, for example, data from kiosks 110, 140, data from mobile wayfinding applications 120, Google™ Maps, and so on. This way, a scale may be applied more accurately to a 3D map in terms of real-world distances. Such coordinate conversion systems (e.g. longitude/latitude) may be used to compute distances based on both location and average walking speed, in real time or near real-time. Routes may be calculated to determine less congested path or less congested areas, based on data points regarding congestion or delays at certain points or paths, as sent by mobile wayfinding applications 120 or kiosks 110, 140, or as received from other sources (e.g. Google™ Maps). The average wait time for an elevator may also be taken into consideration when building a map and calculating a route or time estimate.

A flexible schema may also be included in the 3D map generator 195. For example, to create a new elevator, a user can pick one or more nodes, each from a different floor on a map, and connect the nodes. Where two nodes are connected to one another, there may be an elevator. In some cases, if a venue shuts down an elevator, the map can be updated accordingly in real time, such that visitors will not be routed via that elevator.

Figure 11:
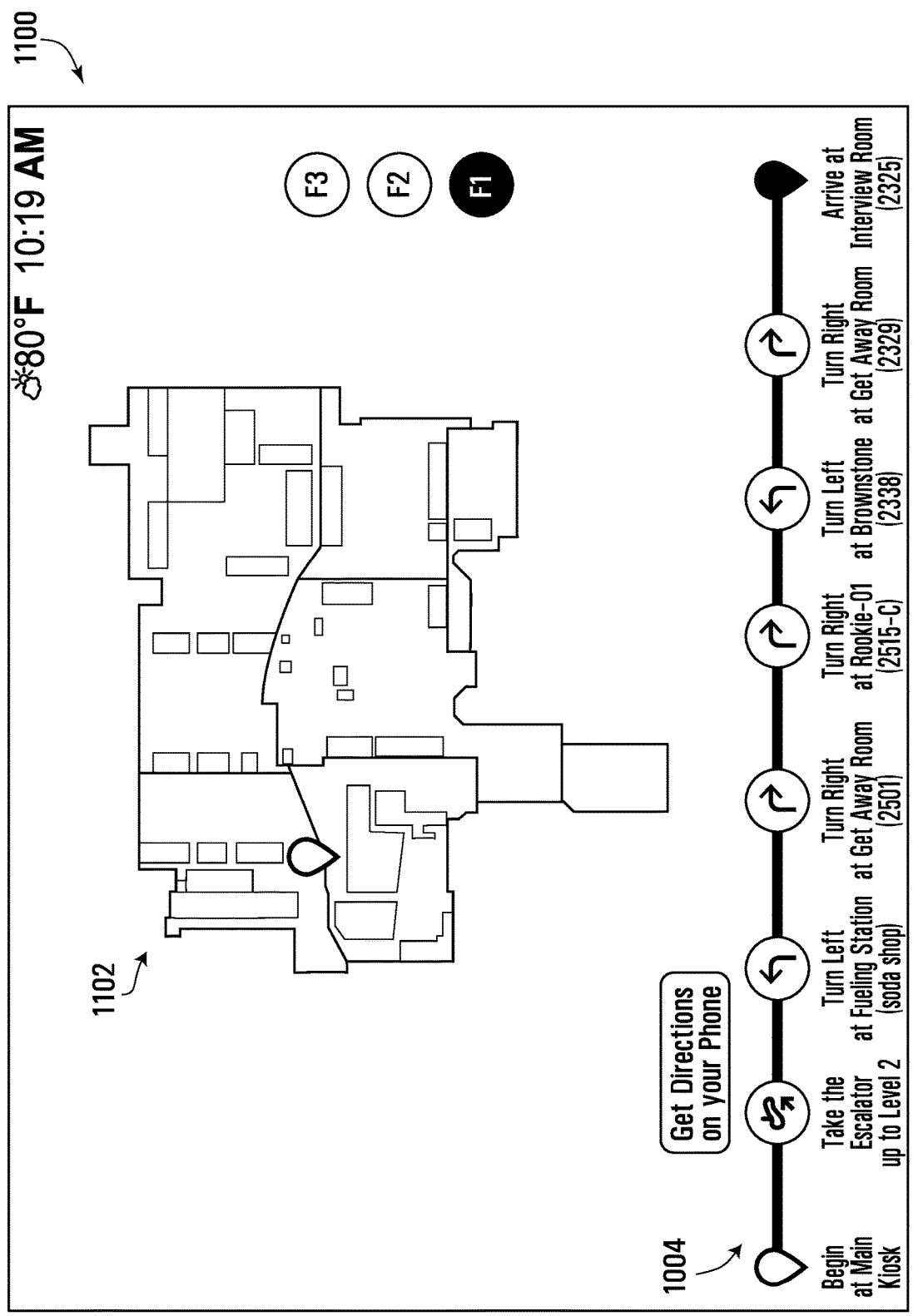
FIG. 11 shows an example user interface showing directions on a kiosk.

Landmarks may be built into the map to allow for meaningful instructions on how to follow calculated routes indoor. For example, well-known, visible and/or popular stores, architectures or landmarks may be each associated with a score in a scoring system for landmarks. A score may be assigned to each of the landmarks, and then during path calculation by navigation engine 530, a path may be calculated based at least in part on highest scores in terms of visible and applicable landmarks. For example, mall fountain may be a well-known landmark that can be used for calculating routes that may pass by the store. For example, FIG. 11 shows an example user interface showing directions on a kiosk.

In some embodiments, the 3D map generator 195 may be configured to animate the path travelled by the user.

In some embodiments, a mapping engine, such as a 3D generator, is configured to generate the 3D map by: receiving a 2D map of the facility, converting or importing the 2D map to a base map, and generating or editing polygons on the base map. Each polygon is representative of a facility unit in the facility map and generating one or more perspectives at one or more points on the base map to generate the 3D map. In some embodiments, the 3D generator is also configured to generate one or more nodes on the base map and generate one or more paths on the base map, each path connecting two one or more nodes.

In some embodiments, generating or editing the polygons includes generating or editing a height of the facility represented by the polygon.

In some embodiments, generating one or more perspectives may include building one or more layers of the base map, each layer comprising one or more objects with similar attributes; and selecting the one or more perspectives by rotating the one or more layers.

As shown in FIG. 6A, an example method for generating 3D map is provided. At 601, a base 2D file (e.g. a CAD file) is received, which includes a 2D map. At 603, an internal review of the 2D map is conducted, which may include reviewing by a client. At 607, unnecessary layers of the 2D map can be removed. Optionally, at 609, the 2D map may be converted to a Scalable Vector Graphics (SVG) format.

At 611, the file is imported into the portal 190 as a base map. At 613, a layers application is used to further edit the polygons (e.g. to provide visually appealing, clean lines) if necessary.

Optionally, at 615, visual inspection of the base map by a user or editor may be carried out. For example, an editor may determine whether the map meets certain quality control standards (e.g., is the map faithful to the submitted file, does the map look visually appealing, etc.). If, at 615, certain quality control standards are not met, the process can return to 611 and the file (e.g. SVG file) can be reimported to the portal 190 as a base map. The process may also return to 609, if necessary, and a new SVG map can be generated. If all quality control standards are met (or if optional 615 is not required), the procedure continues to 617.

Optionally, at 617, polygon properties on the base map may be adjusted (e.g. polygon height, polygon colour, etc.) by default or by a user via a user interface of portal 190. At 619, vector files of icons and logos can be uploaded and applied via the Portal 190. These icons and logos can be fixed in orientation and/or position within the base map or can be dynamically positioned and orientated within the base map. In one example, icons and logs can rotate as the base map is rotated to provide a consistent orientation for a user viewing the base map. At 621, one or more labels may be created and applied via the portal 190.

At 623, the 3D map generator is launched to generate one or more perspectives of the map. The 3D map generator generates map information (e.g. one or more perspectives of the map).

At 625, lighting of the 3D map can be adjusted based on user or default preferences. Optionally, at 627, properties of the polygons are adjusted, or set again, if necessary. At 629, render settings are chosen, which may include rendering size, resolution, and the like. At 631, if necessary, camera angles are adjusted to generate tilting effects, where the tilting effects are provided by the one or more perspectives.

Optionally, at 633, a visual inspection of the generated map is carried out. For example, an editor may determine whether the generated map meets certain quality control standards, such as whether the map is an accurate and faithful rendering of the submitted file, or whether the map looks visually appealing, and so on. If, at 633, certain quality control standards are not met, optional 635 may require a determination of whether polygon changes are necessary. If so, the procedure may return to 613 and clean up the polygons using layers if necessary. Conversely, if no polygon changes on the base map are required, the process returns to 625 and re-adjusts the lighting if necessary. If, at 633, the editor determines that the map meets all quality control standards (or if optional 633 is not required), the map is saved at 637.

At 639, nodes are added to the base map. At 641, paths are added to the base map. At 643, testing steps are conducted to ensure generated map meets quality standards. Optionally, at 645, additional final inspections are carried out. For example, an editor may determine whether any additional changes to the map are required. If changes are necessary, the procedure may return to 639. If no changes are required (or if optional 645 is not required), the procedure will proceed to launch at 647.

Turning now to FIGS. 6B to 6E, illustrated therein is a method 650 for generating a three-dimensional (3D) map, in accordance with a further embodiment.

At 651 a customer device sends a 2D file (e.g. a CAD file), which includes a 2D map, electronically to the system device. At 652 the 2D map in CAD is internally reviewed. At 653 the 2D map in CAD is reviewed with the customer. At 655 the 2D map in CAD is opened in an illustrator application. At 656 the system creates layers in the illustrator application. At 657 the layers are traced and populated. At 658 each layer is saved separately. At 659 a modeling application is opened. At 660 each layer is opened in the modeling application. At 661 each layer is extruded based on layer type. At 662 the system device checks for any visual or format issues. If there are issues the method returns to 657, if not to 664.

Figure 6C:
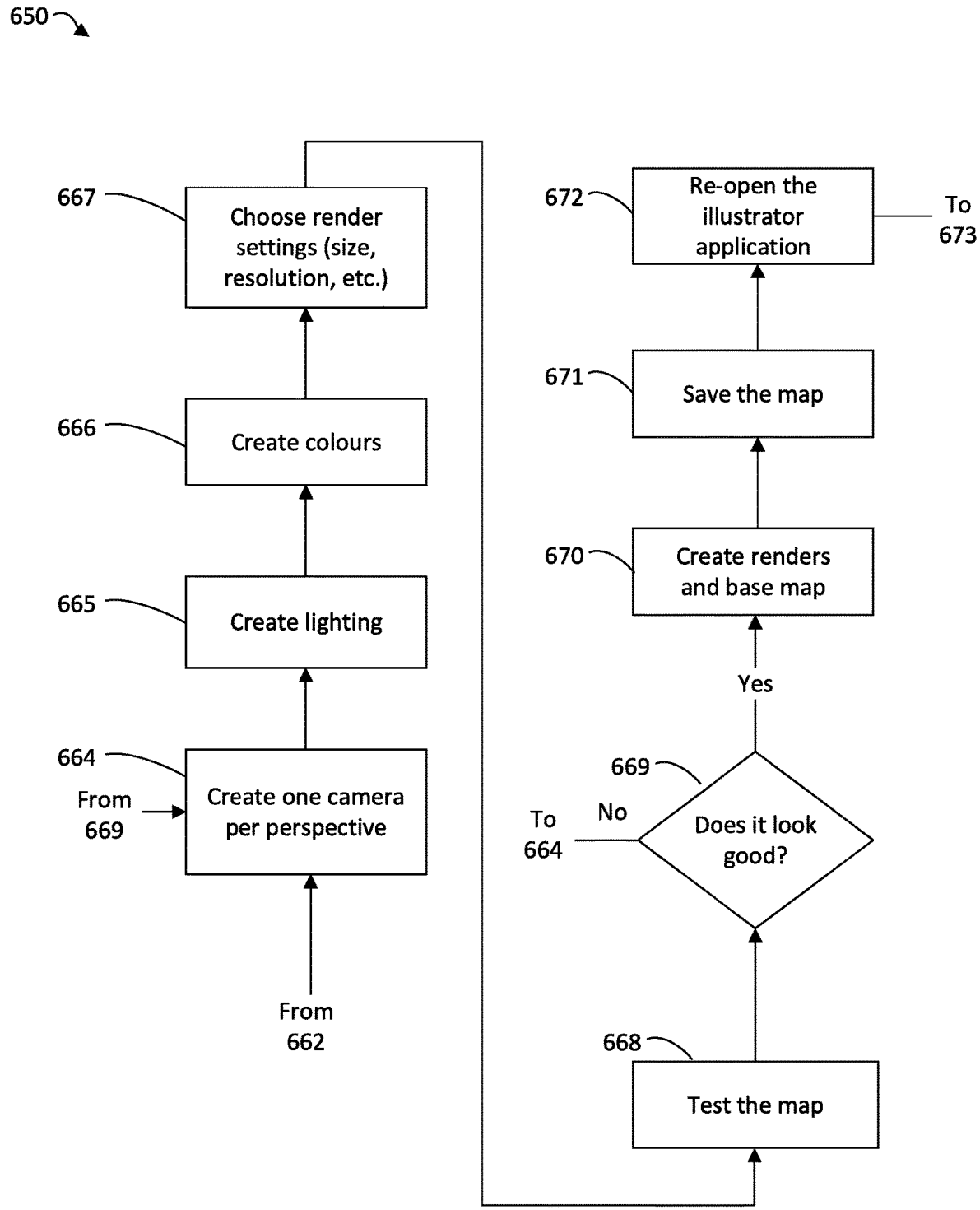

Referring FIG. 6C, at 664 one camera per perspective is created. At 665 lighting is created. At 666 colours are created. At 667 render settings including size and resolution are selected. At 668 the map is tested. If the map is visually acceptable at 669, the renders and base map are created at 670, if not the method returns to 664. At 671 the map is saved. At 672 the illustrator application is reopened.

Figure 6D:
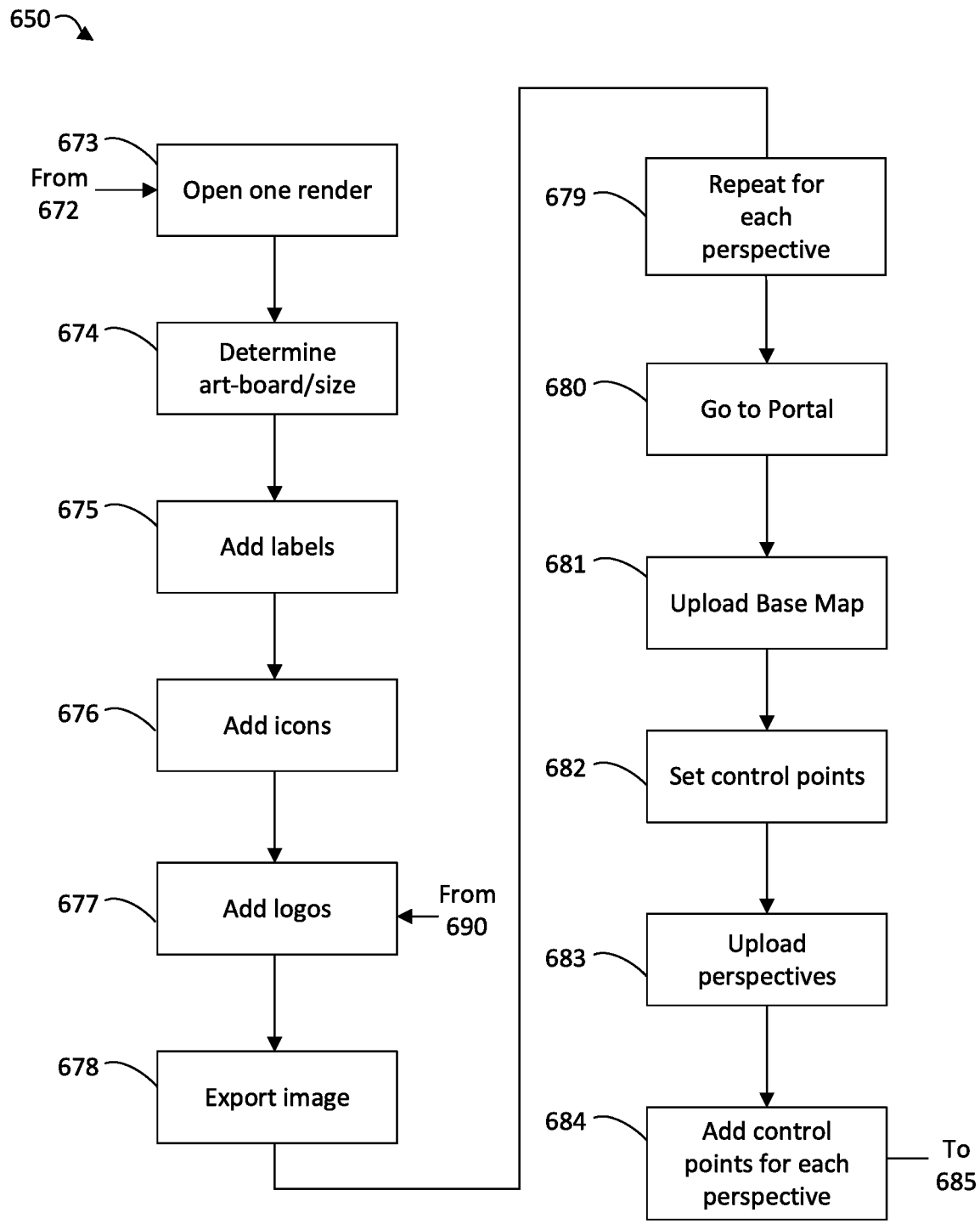

Referring to FIG. 6D, at 673 one render is opened. At 674 art board size is determined. At 675 labels are added. At 676 icons are added. At 677 logos are added. At 678 the image is exported. At 679 the method is repeated for each perspective. At 680 the portal is opened. At 681 the base map is uploaded. At 682 control points are set. At 683 the perspective is uploaded. At 684 control points are added for each perspective.

Figure 6E:
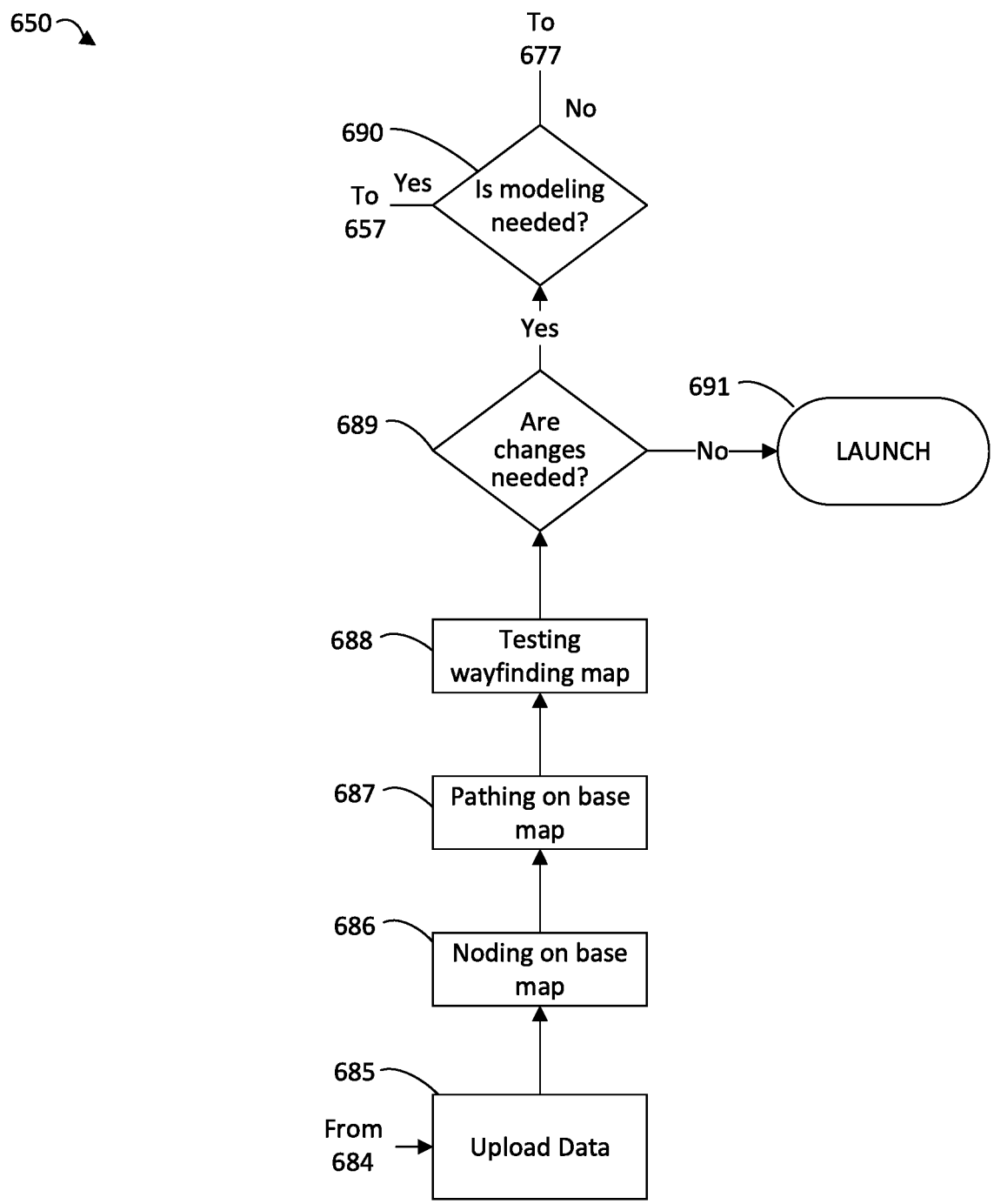

Referring to FIG. 6E, at 685 the data is uploaded. At 686 noding is added to the base map. At 687 pathing is added to the base map. At 688 the wayfinding map is tested. At 689 the wayfinding map is checked for changes. If changes are needed the system checks at 690 whether modeling is needed, if yes then the method returns to 657, if not the method returns to 677. Where no changes are needed at 689 the wayfinding map is finalized and launched at 691.

Figure 6F:
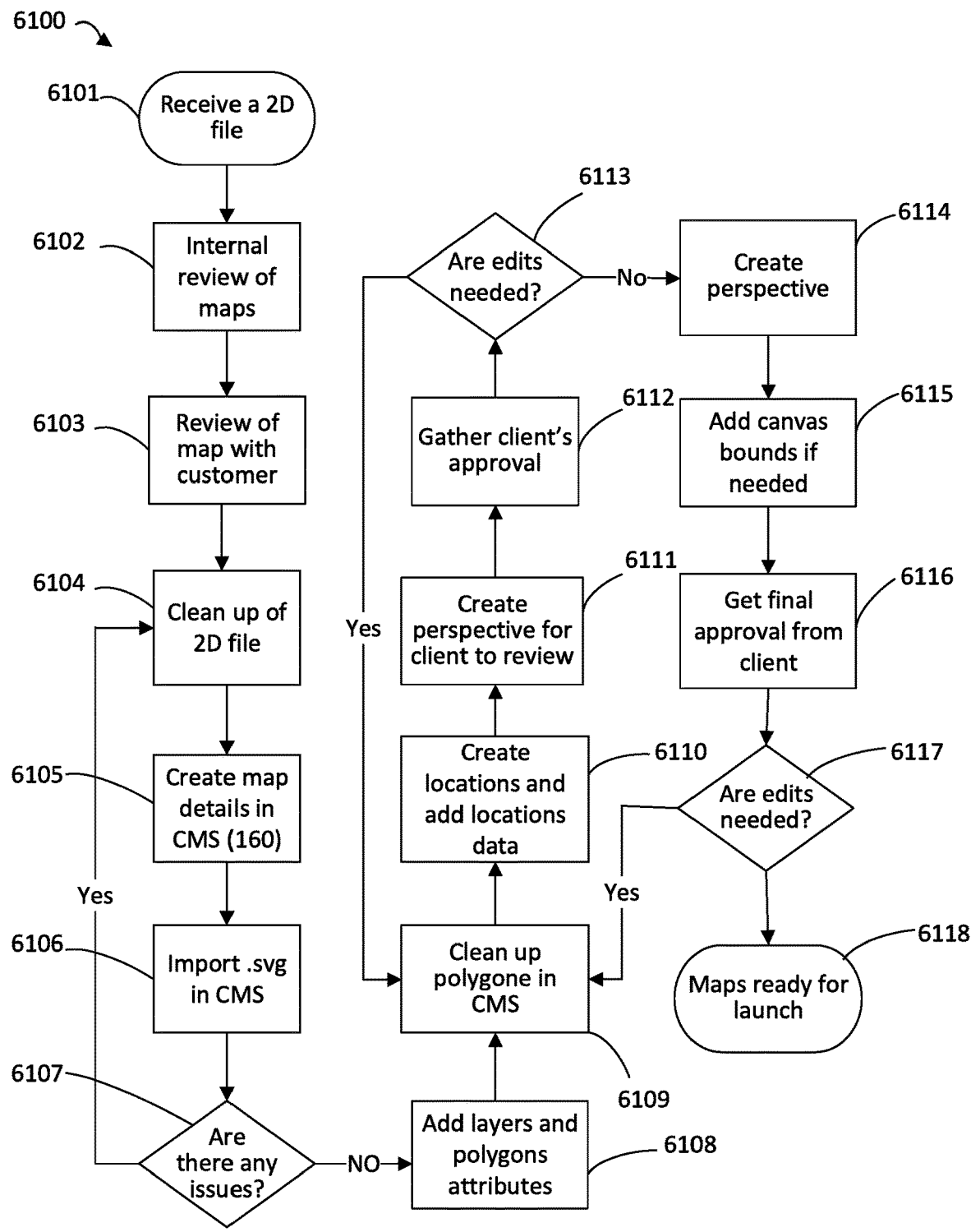
FIG. 6F is another flow chart of a method of creating a 3D map, in accordance with a further embodiment.

As shown in FIG. 6F, an example method 6100 for generating a 3D map is provided, according to another embodiment. At 6101, a base 2D file (e.g. a CAD file) containing a 2D map is received. At 6102, an internal review of the map is conducted. At 6103, a review of the map is conducted with a customer. At 6104, the base 2D file (e.g. a CAD file) is cleaned up (e.g. unnecessary layers of the 2D file may be removed). At 6105, map details are created in the CMS 160. At 6106, a .svg file is imported into the CMS 160. At 6107 visual inspection of the map by a user or editor may be carried out. For example, an editor may determine whether the map meets certain quality control standards (e.g., is the map faithful to the submitted file, does the map look visually appealing, etc.). If, at 6107, certain quality control standards are not met, the process can return to 6104. If all quality control standards are met, the procedure continues to 6108.

At 6108 layers and polygon attributes (e.g. polygon height, polygon colour, etc.) are added to the map by default or by a user via a user interface of portal 190. At 6109 the polygon attributes can be further edited (e.g. to provide visually appealing, clean lines) in CMS 160. At 6110, locations can be created and location data can be added. At 6111, a perspective is created for review by the client (e.g. by a user of the platform 190 or by a client). Review can be by visual inspection of the generated map. For example, a client may determine whether the generated map meets certain quality control standards, such as whether the map is an accurate and faithful rendering of the submitted file, or whether the map looks visually appealing, and so on. At 6112, approval from the client is gathered. At 6113, a determination of whether edits (e.g. polygon changes) are needed is made. If certain quality control standards are not met and edits are needed, the method may return to 6109 and the polygons may be edited using layers if necessary. Conversely, if polygon changes on the base map are not required, the method proceeds to 6114.

At 6114 additional perspectives of the map are created. At 6115 canvas bounds are added, if necessary. At 6116 final approval from the client is gathered. At 6117 a determination of whether additional edits are needed is made. For example, an client may determine whether any additional edits to the map are required. If edits are necessary, the procedure may return to 6109. If no edits are required, the method will proceed to launch at 6118.

FIG. 7 is a wayfinding system 700, in accordance with an embodiment. The wayfinding system 700 includes indoor spatial data 702 that is processed by the wayfinding platform 704 to provide applications 706.

The indoor spatial data 702 includes floor plans, location data, paths/drawings, traffic data, promotions, job postings, and advertisement postings. The wayfinding platform 704 may be configured to include multiple functionalities and/or services such as a perspectives generator 708, an application monitor 710, a digital directory deployment platform 712, a digital directory creator 714, digital maps 716, a 3D map generator 718, a layers manager 720, an analytics engine 722, and a flexible security settings service 724. The wayfinding platform 704 may perform the methods 600, 650.

The wayfinding system 700 provides applications 706 such as but not limited to portal websites, mobile applications, digital directions, leasing flyers or brochures and intelligent reports.

FIGS. 8A to 8E demonstrate various aspects of creating layers for a 3D map using a portal interface. Maps tend to contain large amounts of data, such as paths for generating directions, polygons for creating 3D representations of the venue (e.g. facility units), and the like. A layers management system is described herein which assists users with the task of efficiently and intelligently organizing and working with map data. As illustrated, a user or editor may access layers as part of map-creation or map-updating process via portal management suite 190, available via web browsers.

FIG. 8A illustrates a user interface 800 having a layer 802 on a map 804. The layer 802 may define a group of objects with similar attributes such as type, color, style, and so on. The layer 802 may include all paths 806 on one floor. The layer 802 may also include polygons, walls, or floors. By grouping similar map assets, the map creation process may be streamlined, making it easier for the map editor to make changes to the look and feel of the map 804.

Figure 8B:
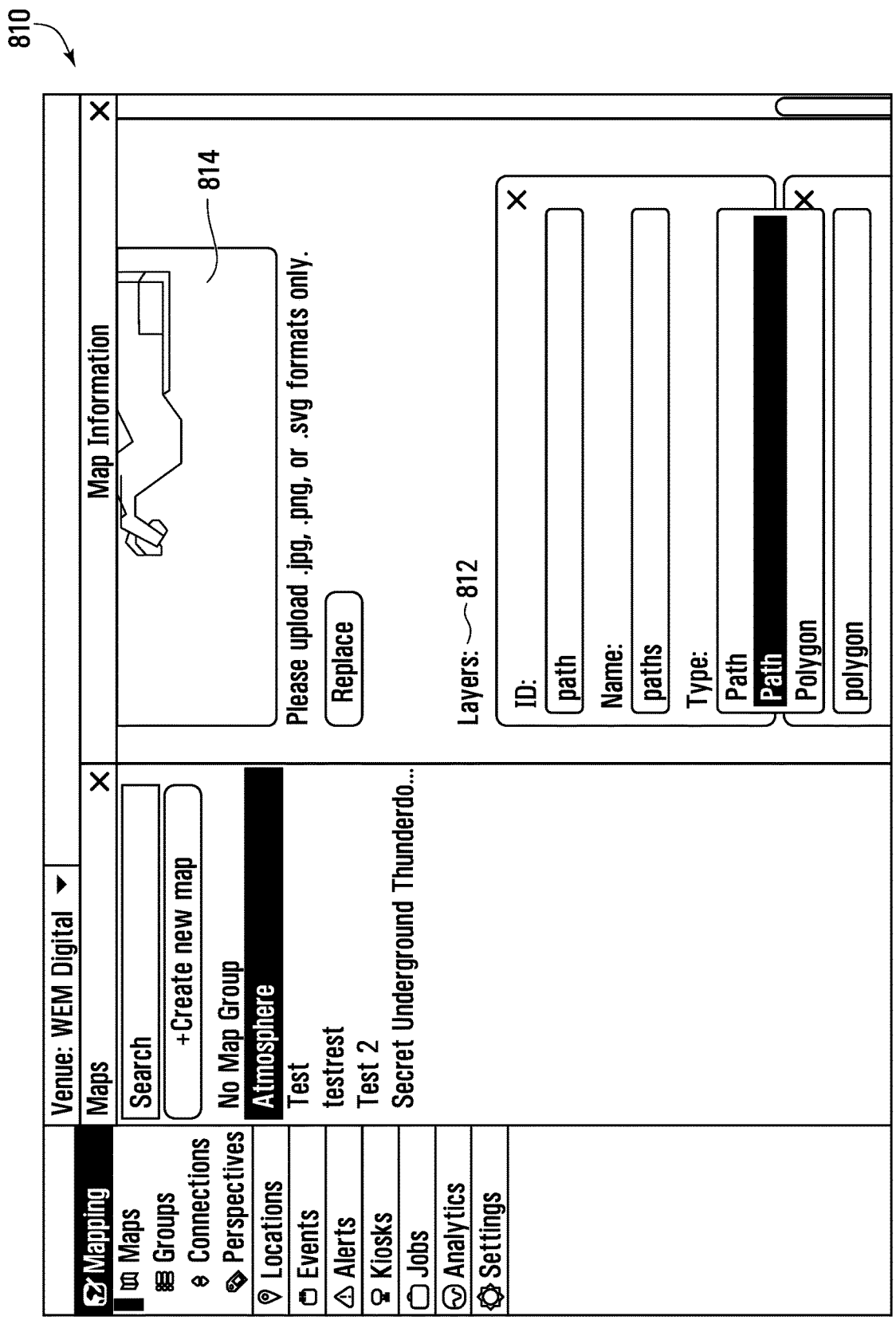

FIG. 8B illustrates a user interface 810 for a process of adding or creating layers 812 to a 3D map 814. Layers 812 may be created on a per map basis. In some embodiments, layers 812 may be created on per floor basis. An editor through portal 190 may navigate to the desired map 814 form, create the new layer 812 in the layers section, and give the layer 812 a name and type. After the layer 812 has been created it will be visible in the layer manager of the corresponding map in editor tool.

Figure 8C:
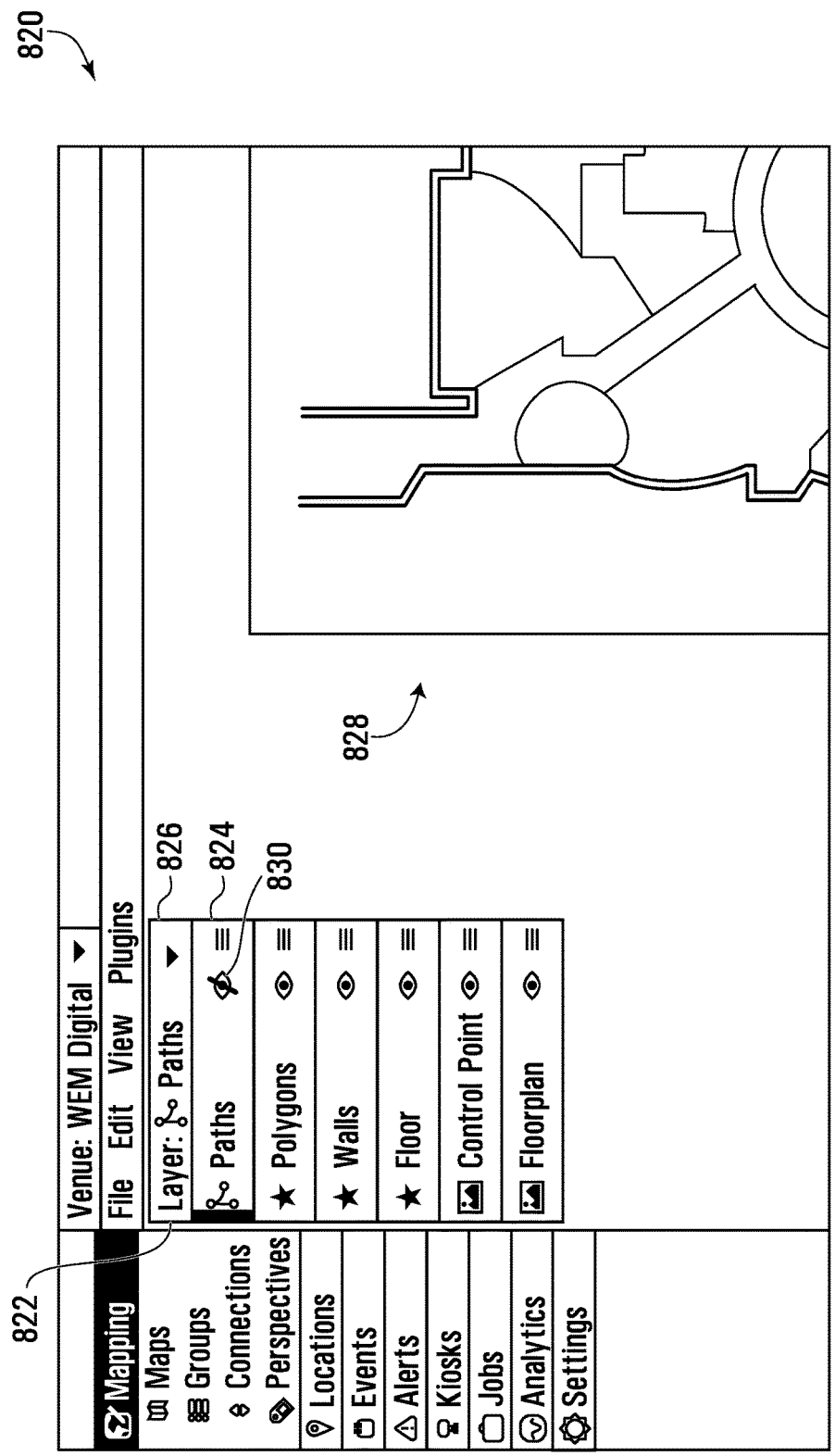

FIG. 8C illustrates a user interface 820 having a layer manager interface 822. The layer manager 822 may be found in the top left corner of the editor tool in Portal. The layer manager 822 is used to switch between layers 824, hide/show layers, and change the drawing order of the layers 824 on the map.

To select a layer 824, the layer manager 822 is selected, the layer list 826 is expanded, and the desired layer 824 is selected. When the layer 824 is selected, the workflow of the map 828 changes to accompany the functions associated with the selected layer's type.

Figure 8D:
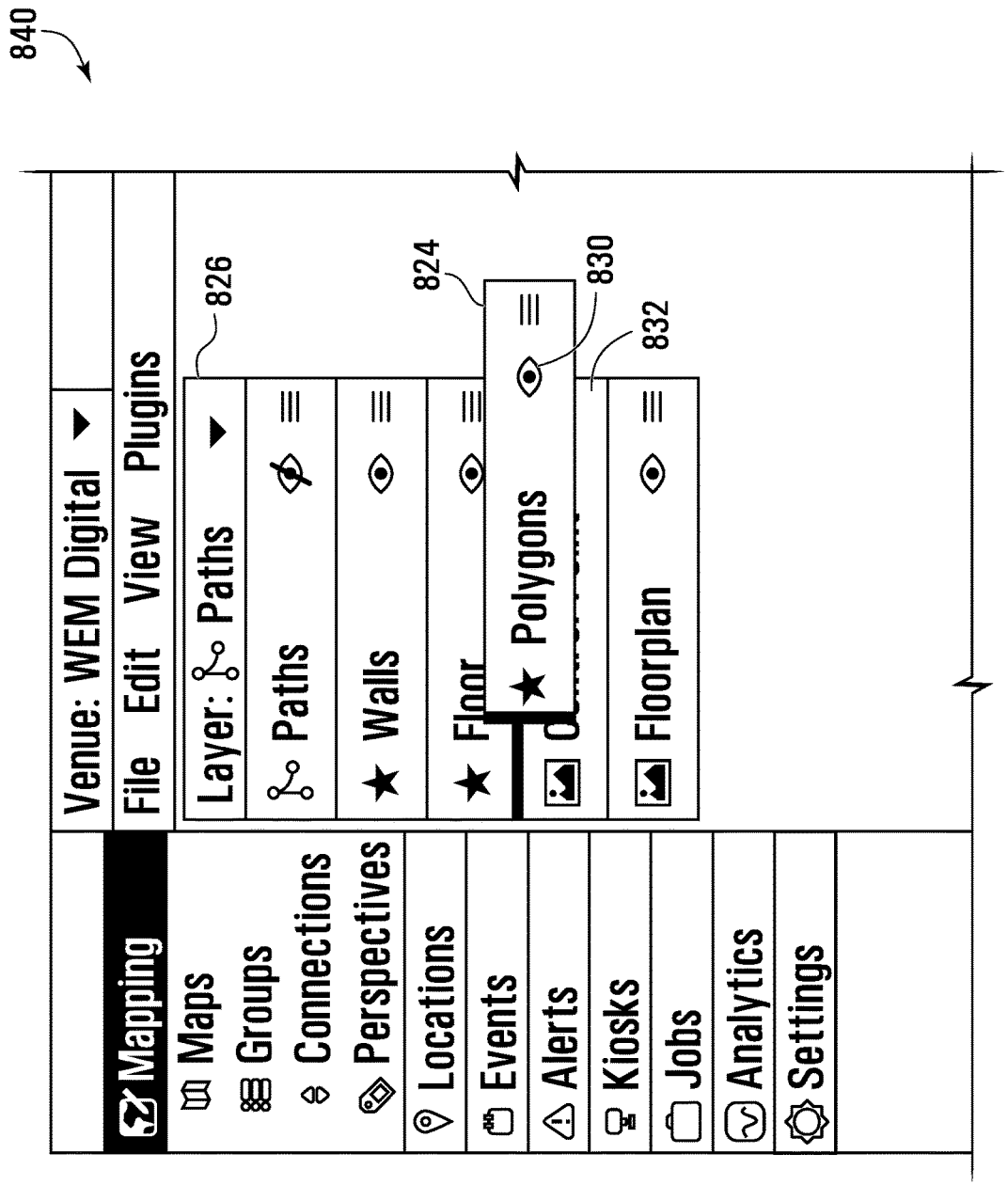

Users or editors can hide and show layers 824 by toggling an eye icon 830 for that layer 824, also shown in the interface 840 of FIG. 8D. Hiding layers 824 can be beneficial to users by reducing clutter, which also increases processing speed of large, asset-heavy maps.

FIG. 8D illustrates the user interface 840 having the order of layers 824 within the layer manager being changed by clicking and dragging the layer 824 to the desired index. The layer 824 may appear above another layer 832 on the map if it is higher in the layer manager list 826 order. Some layers will not be affected visually by layer order such as paths and control points.

Figure 8E:
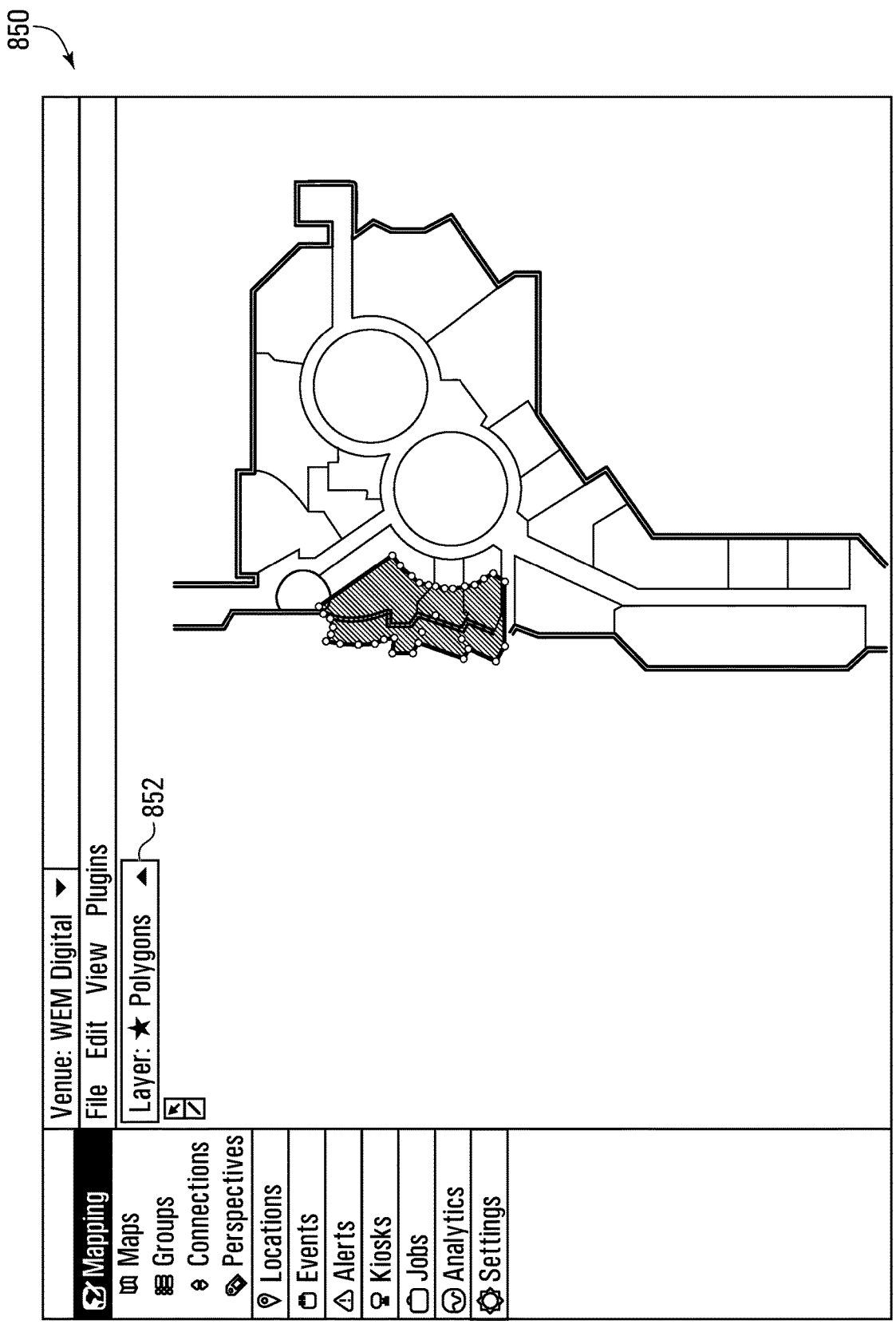

FIG. 8E illustrates a user interface 850, in accordance with a further embodiment. To select an asset on the map in editor tool, the user may select the associated layer in the layer manager 852. The user can then select all assets on a layer and change their attributes simultaneously.

Figure 9A:
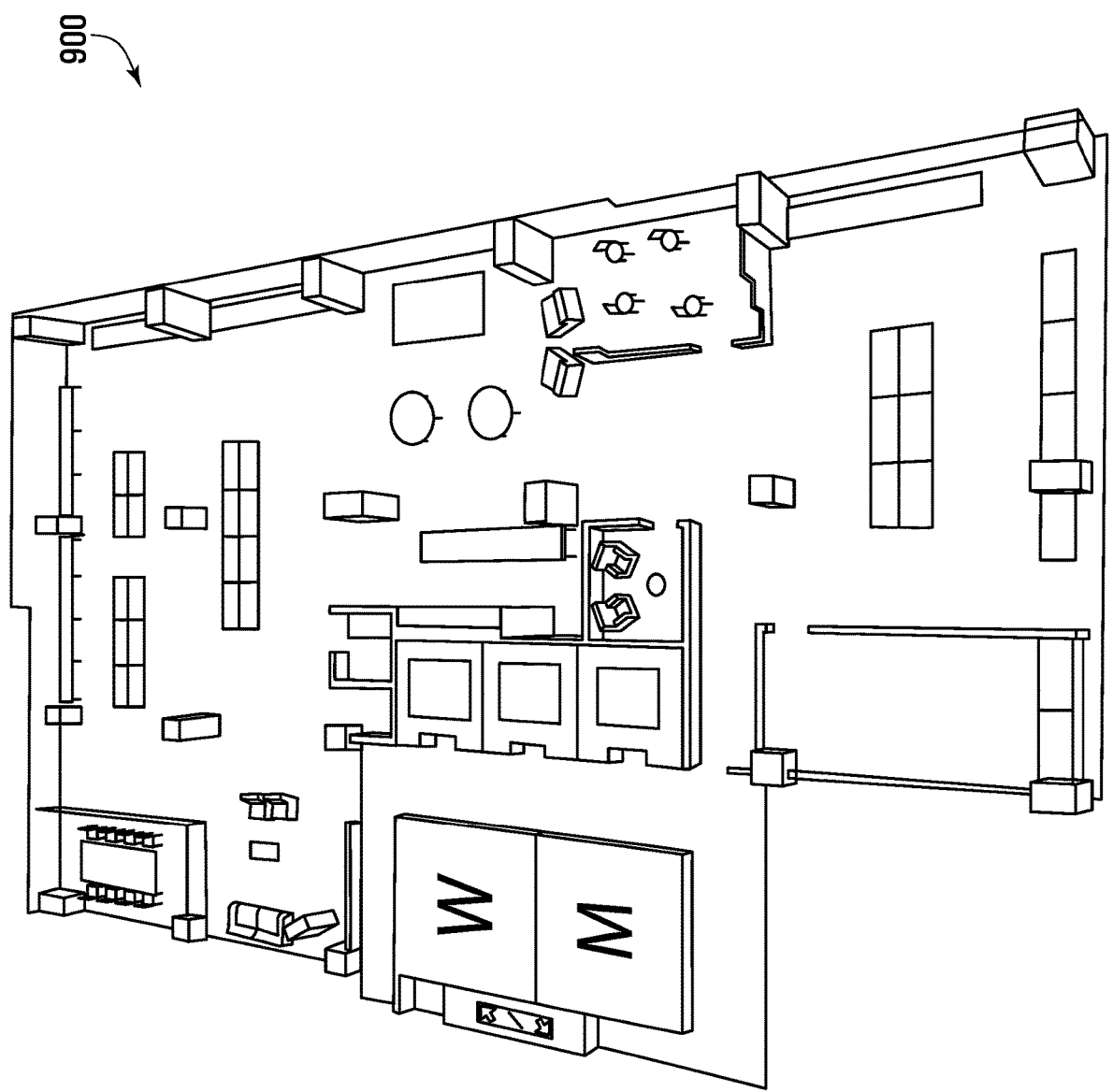
FIG. 9A shows an example 3D map generated by the present system.
Figure 9B:
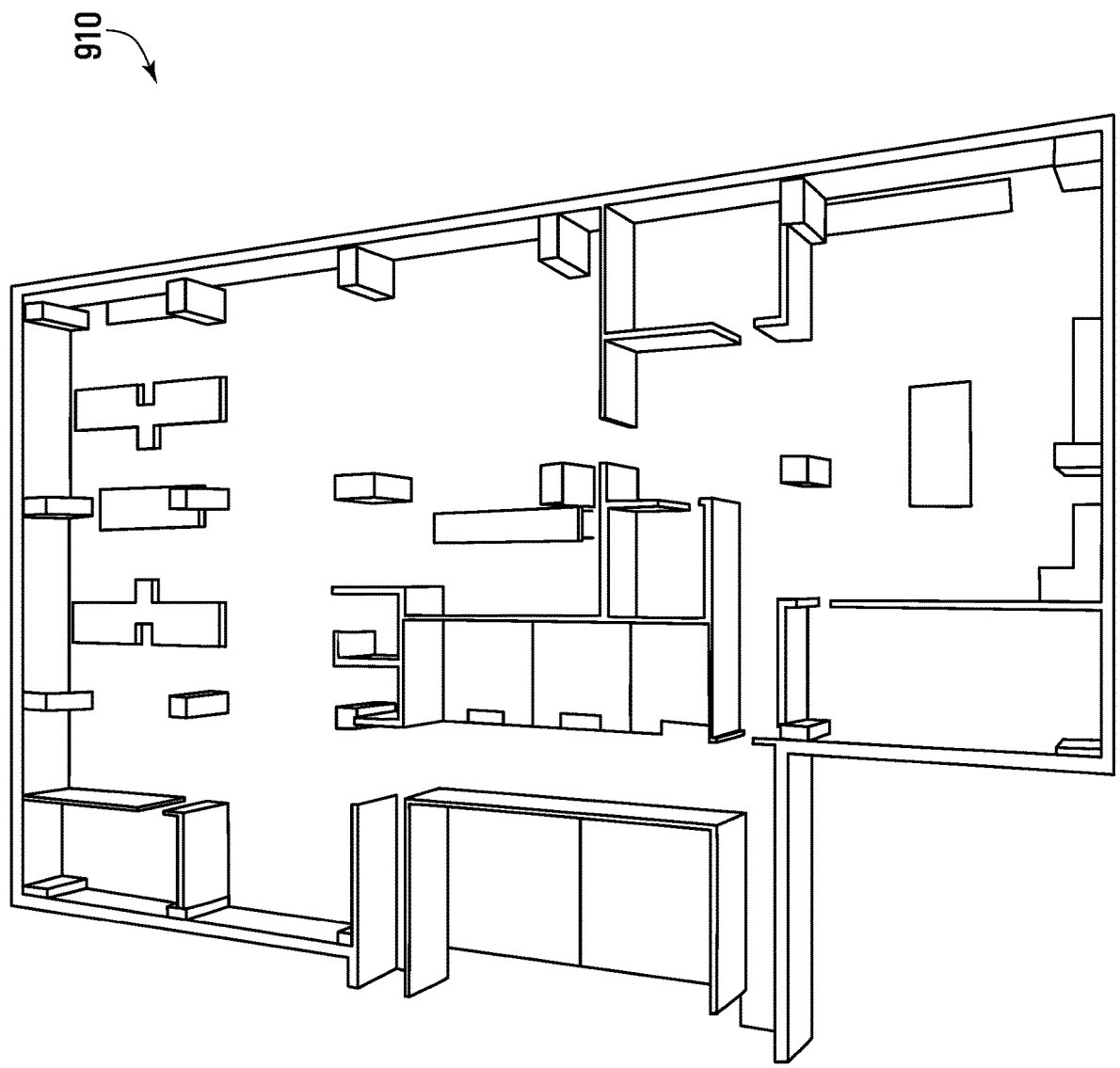
FIG. 9B shows another example 3D map generated by present system.

FIGS. 9A and 9B each shows 3D maps 900, 910 that may be generated by the systems and methods described herein. The layers, once generated and finalized, may combine to create a visually pleasant and accurate 3D map capable of displaying turn-by-turn directions for easy navigation.

FIGS. 10A and 10B illustrate portal user interfaces 1000, 1010, in accordance with an embodiment. The portal 1000 is for creating a new kiosk. The portal 1010 is for editing a 3D map where a user may create a new perspective.

FIG. 11 illustrates user interfaces 1100, in accordance with an embodiment. The user interfaces 1100 includes map 1102, and user directions 1004. The user interfaces 1100 may be displayed on a kiosk.

Figure 12:
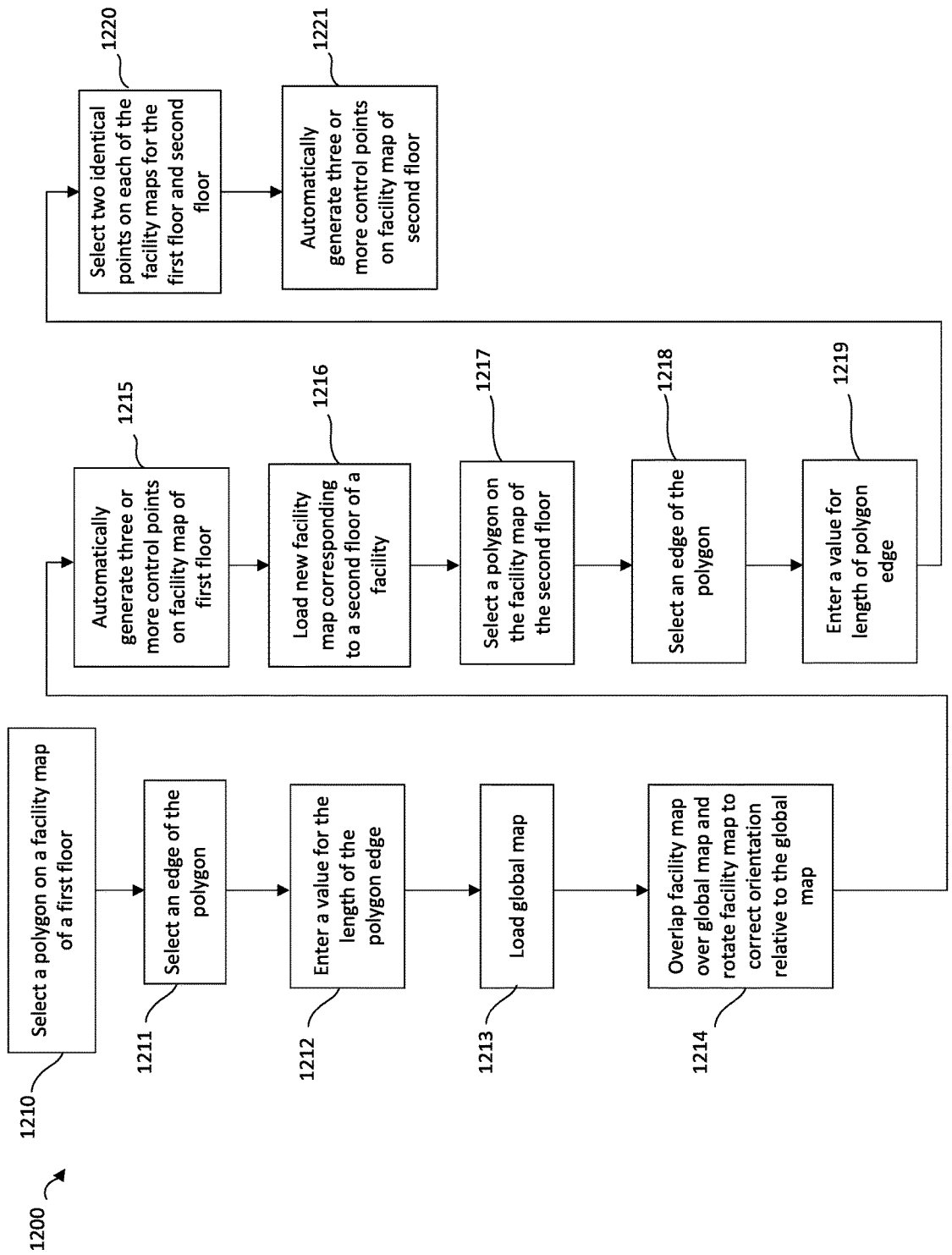
FIG. 12 shows a flow chart of a method for automatically creating control points on a facility map to facilitate geo-referencing in a 3D map.

FIG. 12 illustrates a method 1200 for automatically creating control points on a facility map to facilitate geo-referencing in a 3D map in accordance with a further embodiment. The method 1200 allows for the automatic generation of control points on a facility map (or base map) without the requirement for a user to select the control points manually.

At 1210, a user or editor selects a polygon (i.e. a facility unit) on a facility map (or base map). The facility map may correspond to a first floor of a facility. At 1211, an edge of the polygon is selected. At 1212, the user enters a value corresponding to a length of the polygon edge (i.e. in meters or feet) so as to set a scale for the facility map. For example, this can be done through portal 190. The length of the polygon edge can be ascertained from an original 2D CAD drawing of the facility map. At 1213, the user loads a global map (i.e. satellite imagery, Google™ Maps, or so on). At 1214, the user overlaps the facility map over the global map in accordance with its real world location on the global map. The user, for example, may use the selected polygon as a point of reference. The facility map is then rotated relative to the global map in accordance with its real world orientation. The polygon (or the midpoint of the polygon) now corresponds to a point on the global map defined by a longitude and latitude position. At 1215, three or more control points are automatically generated based on the position of the facility unit (or polygon) relative to the global map.

In a case where a facility includes more than one floor, the user or editor does not need to independently set the control points for each floor of the facility. At 1216, a user can upload a facility map corresponding to a new floor of the facility (i.e. a second floor). At 1217, the user will select a polygon (i.e. facility unit) on the facility map of the second floor. At 1218, the user selects one edge of the polygon. At 1219, the user enters a value corresponding to the length of the polygon edge. At 1220, the user aligns the facility map of the second floor with the facility map of the first floor by selecting two points on the facility map of the first floor, and two identical points on the facility map of the second floor. For example, the two points maybe two corners of an elevator shaft extending between the first floor and the second floor of the facility. At 1221, three or more control points are automatically generated on the facility map of the second floor using position information from the facility map of the first floor (i.e. its position relative to the global map). These steps may be repeated for each new floor added to the facility.

While the above description provides examples of one or more apparatus, methods, or systems, it will be appreciated that other apparatus, methods, or systems may be within the scope of the claims as interpreted by one of skill in the art.

The invention claimed is:

1. A method for generating a three-dimensional (3D) wayfinding map of a facility for a facility visitor by at least one administrator, the method comprising:
   receiving a two-dimensional (2D) map of the facility;
   converting or importing the 2D map to a base map;
   generating or editing polygons on the base map, each polygon representative of a facility unit in the base map;
   generating a plurality of nodes on the base map;
   assigning each node an administrator-adjustable, predetermined wayfinding weight, wherein:
      the wayfinding weight provides a cost associated with using the node or path in calculation of one or more paths;
      wherein a deterrent wayfinding weight allows for passage and has an increased cost; and
      wherein a desirable wayfinding weight has a decreased cost relative to the deterrent wayfinding weight;
   generating one or more paths on the base map based on the wayfinding weight of each node, each path connecting two or more of the plurality of nodes, wherein the one or more paths generated have the lowest associated cost; and
   generating one or more perspectives at one or more points on the base map to generate the 3D map.

2. The method of claim 1, wherein generating or editing the polygons comprises generating or editing a height of the facility unit represented by the polygon.

3. The method of claim 1, wherein the generating one or more perspectives comprises:
   building one or more layers of the base map, each layer comprising one or more objects with similar attributes; and
   selecting the one or more perspectives by rotating the one or more layers.

4. The method of claim 3, wherein the one or more perspectives are selected to generate a tilting effect, the tilting effect giving a sense of height and depth when interacting with the 3D map.

5. The method of claim 1, wherein the 3D map is generated or updated through a portal management suite located on, or operatively connected to, a server platform included in a wayfinding system.

6. The method of claim 5, wherein the portal management suite is accessible through a web browser.

7. The method of claim 1, further comprising:
generating one or more labels; and
applying the one or more labels to each of the one or more perspectives.

8. The method of claim 7, wherein the one or more labels are dynamic labels which rotate as the 3D map is rotated to provide a consistent orientation for the facility visitor viewing the one or more labels.

9. The method of claim 1, further comprising:
selecting an edge of a polygon on the base map;
entering a value for a length of the edge of the polygon;
loading a world map;
transposing the base map on the world map; and
rotating the facility map to correct an orientation of the facility map relative to the world map.

10. The method of claim 1, further comprising:
setting three or more control points on the base map; and
adding the three or more control points to each of the one or more perspectives,
wherein the three or more control points are defined by Cartesian coordinates which facilitate geo-referencing within the 3D map.

11. The method of claim 10, wherein the setting of the three or more control points on the base map includes manually setting or automatically computing the three or more control points on the base map.

12. A system for generating a three-dimensional (3D) wayfinding map of a facility for a facility visitor by at least one administrator, the system comprising:
at least one processor and a memory having stored thereon instructions that, upon execution, cause the system to perform functions comprising:
receiving a 2D map of the facility;
converting or importing the 2D map to a base map;
generating or editing polygons on the base map, each polygon representative of a facility unit in the base map;
generating a plurality of nodes on the base map;
assigning each node an administrator-adjustable, predetermined wayfinding weight, wherein:
the wayfinding weight provides a cost associated with using the node or path in calculation of one or more paths;
wherein a deterrent wayfinding weight allows for passage and has an increased cost; and
wherein a desirable wayfinding weight has a decreased cost relative to the deterrent wayfinding weight;
generating one or more paths on the base map based on the wayfinding weight of each node, each path connecting two or more of the plurality of nodes, wherein the one or more paths generated have the lowest associated cost; and
generating one or more perspectives at one or more points on the base map to generate the 3D map.

13. The system of claim 12, wherein generating or editing the polygons comprises generating or editing a height of the facility unit represented by the polygon.

14. The system of claim 12, wherein the generating one or more perspectives comprises:
building one or more layers of the base map, each layer comprising one or more objects with similar attributes; and
selecting the one or more perspectives by rotating the one or more layers.

15. The system of claim 14, wherein the one or more perspectives are selected to generate a tilting effect, the tilting effect giving a sense of height and depth when interacting with the 3D map.

16. The system of claim 12, wherein the 3D map is generated or updated through a portal management suite located on, or operatively connected to, a server platform included in a wayfinding system.

17. The system of claim 16, wherein the portal management suite is accessible through a web browser.

18. The system of claim 12, further comprising:
generating one or more labels; and
applying the one or more labels to each of the one or more perspectives.

19. The system of claim 18, wherein the one or more labels are dynamic labels which rotate as the 3D map is rotated to provide a consistent orientation for the facility visitor viewing the one or more labels.

20. The system of claim 12, further comprising:
selecting an edge of a polygon on the base map;
entering a value for a length of the edge of the polygon;
loading a world map;
transposing the base map on the world map; and
rotating the facility map to correct an orientation of the facility map relative to the world map.

21. The system of claim 12, further comprising:
setting three or more control points on the base map; and
adding the three or more control points to each of the one or more perspectives,
wherein the three or more control points are defined by Cartesian coordinates which facilitate geo-referencing within the 3D map.

22. The system of claim 21, wherein the setting of the three or more control points on the base map includes manually setting or automatically computing the three or more control points on the base map.

* * * * *